(12) United States Patent
Furusho

(10) Patent No.: US 7,849,289 B2
(45) Date of Patent: Dec. 7, 2010

(54) DISTRIBUTED MEMORY TYPE INFORMATION PROCESSING SYSTEM

(75) Inventor: Shinji Furusho, Yokohami (JP)

(73) Assignee: Turbo Data Laboratories, Inc., Kanagawa (JP)

(*) Notice: Subject to any disclaimer, the term of this patent is extended or adjusted under 35 U.S.C. 154(b) by 911 days.

(21) Appl. No.: 10/595,542

(22) PCT Filed: Oct. 19, 2004

(86) PCT No.: PCT/JP2004/015439
§ 371 (c)(1), (2), (4) Date: Apr. 9, 2007

(87) PCT Pub. No.: WO2005/041067
PCT Pub. Date: May 6, 2005

(65) Prior Publication Data
US 2007/0245124 A1 Oct. 18, 2007

(30) Foreign Application Priority Data
Oct. 27, 2003 (JP) .............................. 2003-365643

(51) Int. Cl.
*G06F 7/24* (2006.01)
*G06F 12/00* (2006.01)
*G06F 17/30* (2006.01)
(52) U.S. Cl. .......................... 712/28; 712/30
(58) Field of Classification Search ................ None
See application file for complete search history.

(56) References Cited

U.S. PATENT DOCUMENTS 6,237,079 B1 * 5/2001 Stoney .................... 712/34
6,393,545 B1 * 5/2002 Long et al. .................... 712/34
6,625,689 B2 * 9/2003 Narad et al. ................ 711/110
6,859,841 B2 * 2/2005 Narad et al. ................ 709/236
6,934,785 B2 * 8/2005 Lee et al. .................... 710/300

FOREIGN PATENT DOCUMENTS

| JP | 2001-092796 | 4/2001 |
| JP | 2001-147800 | 5/2001 |
| WO | 00/10103 | 2/2000 |

OTHER PUBLICATIONS

International Search Report issued in corresponding application No. PCT/JP2004/015439 completed Nov. 22, 2004 and mailed Dec. 7, 2004.

* cited by examiner

*Primary Examiner*—Eric Coleman
(74) *Attorney, Agent, or Firm*—Griffin & Szipl, P.C.

(57) ABSTRACT

In parallel computers, sorting and calculation of large-scale data are realized while large-scale data is held in the respective processors without sharing the large-scale data between the processors so as to reduce communication between the processors. An information processing method gives global dimension value numbers common to all the processing modules to the dimension values for calculation, calculates measures for each of the dimension value numbers within the processing module, and lastly calculates measures commonly between all processing modules. The value list and pointer arrangement to the value list are locally held in each processing module and the order of the dimension values as a reference is globally held between processing modules. As a result, it is possible to eliminate mutual access by processing modules for acquiring data required for calculation and only data required for deciding the order of the dimension values is communicated between the processing modules.

9 Claims, 35 Drawing Sheets

Fig.5

| RECORD NUMBER | SEX | AGE | HEIGHT(cm) |
|---|---|---|---|
| 0 | FEMALE | 3 | 78 |
| 1 | MALE | 1 | 82 |
| 2 | FEMALE | 2 | 69 |
| 3 | FEMALE | 1 | 82 |
| 4 | MALE | 3 | 91 |
| 5 | FEMALE | 1 | 76 |
| 6 | FEMALE | 1 | 78 |
| 7 | FEMALE | 2 | 84 |
| 8 | MALE | 3 | 87 |
| 9 | FEMALE | 3 | 80 |

OFFSET=0

PMM-0
| | SEX | AGE | HEIGHT |
|---|---|---|---|
| 0 | FEMALE | 3 | 78 |
| 1 | MALE | 1 | 82 |
| 2 | FEMALE | 2 | 69 |

| | GOrd | OrdSet |
|---|---|---|
| 0 | 0 | 0 |
| 1 | 1 | 1 |
| 2 | 2 | 2 |
ASCENDING ORDER

SEX (PMM-0)
| VNo | | | VL | | GVNo |
|---|---|---|---|---|---|
| 0 | 1 | 0 | MALE | 0 | 0 |
| 1 | 0 | 1 | FEMALE | 1 | 1 |
| 2 | 1 | | | | |
ASCENDING ORDER

AGE (PMM-0)
| VNo | | | VL | | GVNo |
|---|---|---|---|---|---|
| 0 | 2 | 0 | 1 | 0 | 0 |
| 1 | 0 | 1 | 2 | 1 | 1 |
| 2 | 1 | 2 | 3 | 2 | 2 |
ASCENDING ORDER

SORT BY AGE
| | GOrd | OrdSet |
|---|---|---|
| 0 | - | 1 |
| 1 | - | 2 |
| 2 | - | 0 |

SORT BY SEX
| | GOrd | OrdSet |
|---|---|---|
| 0 | - | 1 |
| 1 | - | 2 |
| 2 | - | 0 |

OFFSET=3

PMM-1
| | SEX | AGE | HEIGHT |
|---|---|---|---|
| 0 | FEMALE | 1 | 82 |
| 1 | MALE | 3 | 91 |

| | GOrd | OrdSet |
|---|---|---|
| 0 | 3 | 0 |
| 1 | 4 | 1 |
ASCENDING ORDER

SEX (PMM-1)
| VNo | | | VL | | GVNo |
|---|---|---|---|---|---|
| 0 | 1 | 0 | MALE | 0 | 0 |
| 1 | 0 | 1 | FEMALE | 1 | 1 |
ASCENDING ORDER

AGE (PMM-1)
| VNo | | | VL | | GVNo |
|---|---|---|---|---|---|
| 0 | 1 | 0 | 1 | 0 | 0 |
| 1 | 1 | 1 | 3 | 1 | 2 |
ASCENDING ORDER

SORT BY AGE
| | GOrd | OrdSet |
|---|---|---|
| 0 | - | 0 |
| 1 | - | 1 |

SORT BY SEX
| | GOrd | OrdSet |
|---|---|---|
| 0 | - | 1 |
| 1 | - | 0 |

OFFSET=5

PMM-2
| | SEX | AGE | HEIGHT |
|---|---|---|---|
| 0 | FEMALE | 1 | 76 |
| 1 | FEMALE | 1 | 78 |
| 2 | FEMALE | 2 | 84 |

| | GOrd | OrdSet |
|---|---|---|
| 0 | 5 | 0 |
| 1 | 6 | 1 |
| 2 | 7 | 2 |
ASCENDING ORDER

SEX (PMM-2)
| VNo | | | VL | | GVNo |
|---|---|---|---|---|---|
| 0 | 0 | 0 | FEMALE | 0 | 1 |
| 1 | 0 | | | | |
| 2 | 0 | | | | |
ASCENDING ORDER

AGE (PMM-2)
| VNo | | | VL | | GVNo |
|---|---|---|---|---|---|
| 0 | 1 | 0 | 1 | 0 | 0 |
| 1 | 1 | 1 | 2 | 1 | 1 |
| 2 | 1 | | | | 2 |
ASCENDING ORDER

SORT BY AGE
| | GOrd | OrdSet |
|---|---|---|
| 0 | - | 0 |
| 1 | - | 1 |
| 2 | - | 2 |

SORT BY SEX
| | GOrd | OrdSet |
|---|---|---|
| 0 | - | 0 |
| 1 | - | 1 |
| 2 | - | 2 |

OFFSET=8

PMM-3
| | SEX | AGE | HEIGHT |
|---|---|---|---|
| 0 | MALE | 3 | 87 |
| 1 | FEMALE | 3 | 80 |

| | GOrd | OrdSet |
|---|---|---|
| 0 | 8 | 0 |
| 1 | 9 | 1 |
ASCENDING ORDER

SEX (PMM-3)
| VNo | | | VL | | GVNo |
|---|---|---|---|---|---|
| 0 | 0 | 0 | MALE | 0 | 0 |
| 1 | 1 | 1 | FEMALE | 1 | 2 |
ASCENDING ORDER

AGE (PMM-3)
| VNo | | | VL | | GVNo |
|---|---|---|---|---|---|
| 0 | 0 | 0 | 3 | 0 | 2 |
| 1 | 0 | | | | |
ASCENDING ORDER

SORT BY AGE
| | GOrd | OrdSet |
|---|---|---|
| 0 | - | 0 |
| 1 | - | 1 |

SORT BY SEX
| | GOrd | OrdSet |
|---|---|---|
| 0 | - | 0 |
| 1 | - | 1 |

Fig.13

|        | LDimNo | GNo1 | GNo2 | GDimNo |
|--------|--------|------|------|--------|
| PMM-0  | 0      | 0    | 0    | 0      |
|        | 1      | 1    | 1    | 3      |
|        | 2      | 1    | 2    | 4      |
| PMM-1  | 0      | 0    | 2    | 1      |
|        | 1      | 1    | 0    | 2      |
| PMM-2  | 0      | 1    | 0    | 2      |
|        | 1      | 1    | 1    | 3      |
| PMM-3  | 0      | 0    | 2    | 1      |
|        | 1      | 1    | 1    | 2      |

Fig.14

OFFSET=0   PMM-0

| | SEX | AGE | HEIGHT |
|---|---|---|---|
| 0 | FEMALE | 3 | 78 |
| 1 | MALE | 1 | 82 |
| 2 | FEMALE | 2 | 69 |

| GDimNo | | GDimPos | | LDimNo | | SEX GVNo | | AGE GVNo | | GMsr | |
|---|---|---|---|---|---|---|---|---|---|---|---|
| 0 | 0 | 0 | → | 0 | 0 | 0 | 0 | 0 | 0 | 0 | 0 |
| 1 | 3 | 1 | → | 1 | 1 | 1 | 0 | 1 | 1 | 1 | 0 |
| 2 | 4 | 2 | → | 2 | 2 | 2 | 1 | 2 | 2 | 2 | 0 |

OFFSET=3   PMM-1

| | SEX | AGE | HEIGHT |
|---|---|---|---|
| 0 | FEMALE | 1 | 82 |
| 1 | MALE | 3 | 91 |

| GDimNo | | GDimPos | | LDimNo | | SEX GVNo | | AGE GVNo | | GMsr | |
|---|---|---|---|---|---|---|---|---|---|---|---|
| 0 | 1 | 0 | → | 0 | 0 | 0 | 0 | 0 | 2 | 0 | 0 |
| 1 | 2 | 1 | → | 1 | 1 | 1 | 1 | 1 | 0 | 1 | 0 |

OFFSET=5   PMM-2

| | SEX | AGE | HEIGHT |
|---|---|---|---|
| 0 | FEMALE | 1 | 76 |
| 1 | FEMALE | 1 | 78 |
| 2 | MALE | 2 | 84 |

| GDimNo | | GDimPos | | LDimNo | | SEX GVNo | | AGE GVNo | | GMsr | |
|---|---|---|---|---|---|---|---|---|---|---|---|
| 0 | 2 | 0 | → | 0 | 0 | 0 | 1 | 0 | 0 | 0 | 0 |
| 1 | 3 | 2 | ↘ | 1 | 0 | 1 | 1 | 1 | 0 | 1 | 0 |
| 2 | | | | 2 | 1 | 2 | 2 | 2 | 1 | | |

OFFSET=8   PMM-3

| | SEX | AGE | HEIGHT |
|---|---|---|---|
| 0 | MALE | 2 | 87 |
| 1 | FEMALE | 3 | 80 |

| GDimNo | | GDimPos | | LDimNo | | SEX GVNo | | AGE GVNo | | GMsr | |
|---|---|---|---|---|---|---|---|---|---|---|---|
| 0 | 1 | 0 | → | 0 | 0 | 0 | 0 | 0 | 2 | 0 | 0 |
| 1 | 4 | 1 | → | 1 | 1 | 1 | 1 | 1 | 2 | 1 | 0 |

Fig.17

Fig.18
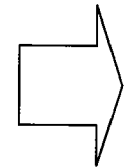
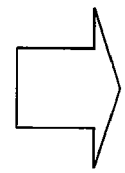
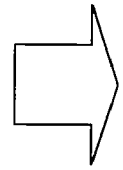
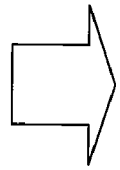

Fig.19

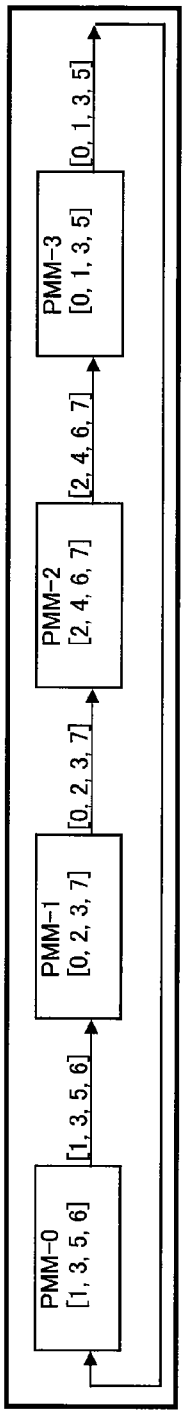
Fig.23A STEP1
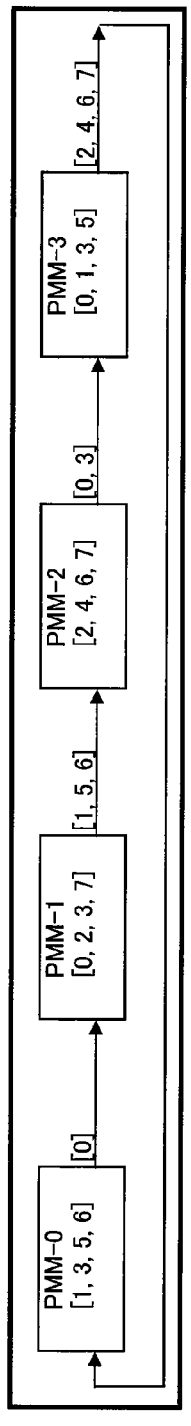
Fig.23B STEP2
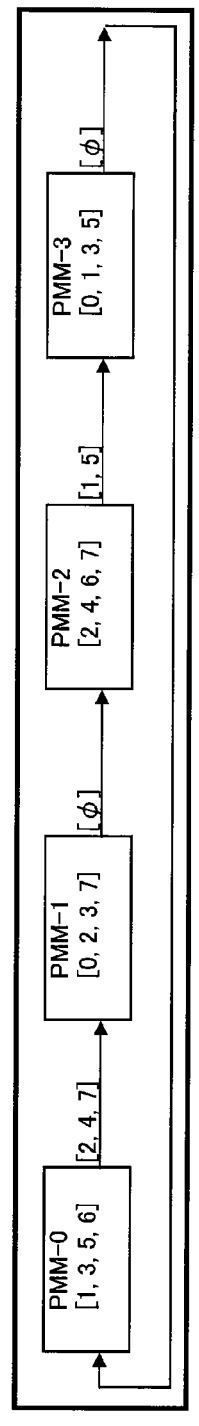
Fig.23C STEP3
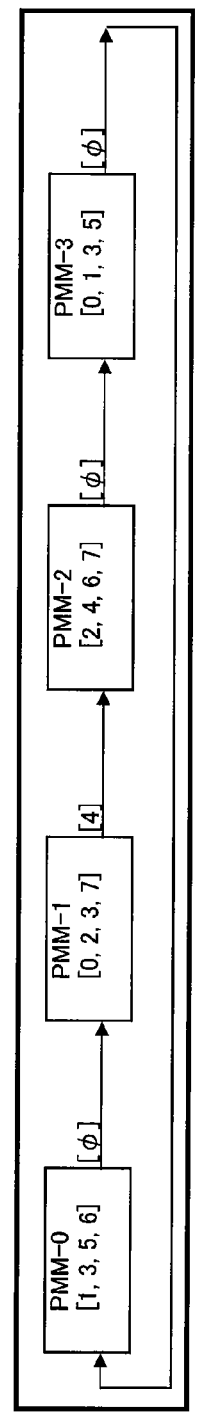
Fig.23D STEP4

Fig.24A

STEP1

| RECEIVED LIST | | | |
|---|---|---|---|
| PMM-0 [0, 1, 3, 5] | PMM-1 [1, 3, 5, 6] | PMM-2 [0, 2, 3, 7] | PMM-3 [2, 4, 6, 7] |

Fig.24B

STEP2

| RECEIVED LIST | | | |
|---|---|---|---|
| PMM-0 [0, 1, 3, 5] [2, 4, 6, 7] | PMM-1 [1, 3, 5, 6] [0] | PMM-2 [0, 2, 3, 7] [1, 5, 6] | PMM-3 [2, 4, 6, 7] [0, 3] |

Fig.24C

STEP3

| RECEIVED LIST | | | |
|---|---|---|---|
| PMM-0 [0, 1, 3, 5] [2, 4, 6, 7] [φ] | PMM-1 [1, 3, 5, 6] [0] [2, 4, 7] | PMM-2 [0, 2, 3, 7] [1, 5, 6] [φ] | PMM-3 [2, 4, 6, 7] [0, 3] [1, 5] |

Fig.24D

STEP4

| RECEIVED LIST | | | |
|---|---|---|---|
| PMM-0 [0, 1, 3, 5] [2, 4, 6, 7] [φ] [φ] | PMM-1 [1, 3, 5, 6] [0] [2, 4, 7] [φ] | PMM-2 [0, 2, 3, 7] [1, 5, 6] [φ] [4] | PMM-3 [2, 4, 6, 7] [0, 3] [1, 5] [φ] |

Fig.25

AGE (PMM-0)

| | GOrd | OrdSet | | VNo | | VL | | GVNo |
|---|---|---|---|---|---|---|---|---|
| 0 | 0 | 0 | 0 | 0 | 0 | 18 | 0 | 1 |
| 1 | 1 | 1 | 1 | 1 | 1 | 21 | 1 | 3 |
| 2 | 2 | 2 | 2 | 2 | 2 | 24 | 2 | 4 |

ASCENDING ORDER / ASCENDING ORDER / ASCENDING ORDER

AGE (PMM-1)

| | GOrd | OrdSet | | VNo | | VL | | GVNo |
|---|---|---|---|---|---|---|---|---|
| 0 | 3 | 0 | 0 | 0 | 0 | 16 | 0 | 0 |
| 1 | 4 | 1 | 1 | 1 | 1 | 28 | 1 | 5 |

ASCENDING ORDER / ASCENDING ORDER / ASCENDING ORDER

AGE (PMM-2)

| | GOrd | OrdSet | | VNo | | VL | | GVNo |
|---|---|---|---|---|---|---|---|---|
| 0 | 5 | 0 | 0 | 1 | 0 | 16 | 0 | 0 |
| 1 | 6 | 1 | 1 | 0 | 1 | 20 | 1 | 2 |
| 2 | 7 | 2 | 2 | 2 | 2 | 33 | 2 | 6 |

ASCENDING ORDER / ASCENDING ORDER / ASCENDING ORDER

AGE (PMM-3)

| | GOrd | OrdSet | | VNo | | VL | | GVNo |
|---|---|---|---|---|---|---|---|---|
| 0 | 8 | 0 | 0 | 1 | 0 | 18 | 0 | 1 |
| 1 | 9 | 1 | 1 | 0 | 1 | 24 | 1 | 4 |

ASCENDING ORDER / ASCENDING ORDER / ASCENDING ORDER

PMM-0

| ACCUMULATED NUMBER ARRAY | | GVNo' | GOrd' | OrdSet' |
|---|---|---|---|---|
| 0 | 0 | 1 | 0 | 0 |
| 1 | 1 | 3 | 1 | 1 |
| 2 | 2 | 4 | 2 | 2 |
| | | ASCENDING ORDER | ASCENDING ORDER 2 | |

PMM-1

| ACCUMULATED NUMBER ARRAY | | GVNo' | GOrd' | OrdSet' |
|---|---|---|---|---|
| 0 | 0 | 0 | 3 | 0 |
| 1 | 1 | 5 | 4 | 1 |
| | | ASCENDING ORDER | ASCENDING ORDER 2 | |

PMM-2

| ACCUMULATED NUMBER ARRAY | | GVNo' | GOrd' | OrdSet' |
|---|---|---|---|---|
| 0 | 0 | 0 | 6 | 1 |
| 1 | 1 | 2 | 5 | 0 |
| 2 | 2 | 6 | 7 | 2 |
| | | ASCENDING ORDER | ASCENDING ORDER 2 | |

PMM-3

| ACCUMULATED NUMBER ARRAY | | GVNo' | GOrd' | OrdSet' |
|---|---|---|---|---|
| 0 | 0 | 1 | 9 | 1 |
| 1 | 1 | 4 | 8 | 0 |
| | | ASCENDING ORDER | ASCENDING ORDER 2 | |

Fig.35A

ARRAY CREATION

| OrdSet | GVNo OF SEX | GVNo OF AGE | GOrd |
|---|---|---|---|
| 0 | 1 | 2 | 0 |
| 1 | 0 | 0 | 1 |
| 2 | 1 | 1 | 2 |

Fig.35B

ORDER NUMBER INITIALIZATION

| OrdSet | ORDER NUMBER |
|---|---|
| 0 | 0 |
| 1 | 0 |
| 2 | 0 |

Fig.35C

ORDER NUMBER ALLOCATION 1

| OrdSet | ORDER NUMBER |
|---|---|
| 0 | 0→1 |
| 1 | 0 |
| 2 | 0→1 |

Fig.35D

ORDER NUMBER ALLOCATION 2

| OrdSet | ORDER NUMBER |
|---|---|
| 0 | 1→2 |
| 1 | 0 |
| 2 | 1 |

Fig.35E

RESULT

| ORDER NUMBER | OrdSet | GVNo OF SEX | GVNo OF AGE | GOrd |
|---|---|---|---|---|
| 2 | 0 | 1 | 2 | 0 |
| 0 | 1 | 0 | 0 | 1 |
| 1 | 2 | 1 | 1 | 2 |

Fig.35F

RESULT

| ORDER NUMBER | OrdSet | GVNo OF SEX | GVNo OF AGE | GOrd |
|---|---|---|---|---|
| 0 | 1 | 0 | 0 | 1 |
| 1 | 2 | 1 | 1 | 2 |
| 2 | 0 | 1 | 2 | 0 |

# DISTRIBUTED MEMORY TYPE INFORMATION PROCESSING SYSTEM

This is a National Phase Application in the United States of International Patent Application No. PCT/JP2004/015439 filed Oct. 19, 2004, which claims priority on Japanese Patent Application No. 2003-365643, filed Oct. 27, 2003. The entire disclosures of the above patent applications are hereby incorporated by reference.

BACKGROUND OF THE INVENTION

1. Technical Field of the Invention

The present invention relates to an information processing method and an information processing apparatus for processing a large amount of data, and, more particularly to an information processing method and an information processing system that adopt an architecture of a parallel computer.

2. Description of Related Art/Background Art

Conventionally, data processing for accumulating a large amount of information and retrieving and tabulating the accumulated information has been performed. The data processing is used in, for example, a well-known computer system in which a CPU, a memory, peripheral equipment interfaces, an auxiliary storing device such as a hard disk, display devices such as a display and a printer, input devices such as a keyboard and a mouse, and a power supply unit are connected via a bus. In particular, the data processing is provided as software operable in a computer system easily available in the market. In order to perform the data processing such as retrieval and tabulation, in particular, various databases for accumulating a large amount of data are known. Among the large amount of data, in particular, there is a strong demand for processing of data that could be represented in a table format.

It depends on a format for storing a large amount of data whether the large amount of data can be efficiently retrieved and tabulated. Conventionally, a so-called "row unit" storage technique and a so-called "item unit" storage technique are known as general storage techniques. In the case of the row unit storage technique, sets of item values of sex, age, and occupation formed for each record number are stored on a disk in an order of record numbers and in an order of the increase of a logical address. On the other hand, in the case of the item unit storage technique, item values are stored on a disk in an order of record numbers and in a direction of the increase of a logical address.

In the case of the conventional techniques, item values for all items of all record numbers are directly stored in a two-dimensional data structure (consisting of one dimension of the record numbers and one dimension of the other item values). Such a data structure will be hereinafter specifically referred to as "data table". In the case of the conventional techniques, in retrieving and tabulating accumulated data, this data table is accessed to perform the retrieval and the tabulation.

Besides the method of directly storing values of items as item values, there is also known a method of converting values into codes and storing the codes as item values. Even in this case, the method is the same as the method described above in that the codes subjected to the code conversion are stored in the data table as the item values.

In retrieving and tabulating a large amount of data stored using the data structure of the data table type of the conventional techniques, there is a problem in that processing time for retrieval and tabulation lengthens because of an access time for accessing such a data table.

The data table at least has essential disadvantages described below.

(1) The data table increases in size. Moreover, for example, it is difficult to (physically) divide the data table for each item. Practically, it is difficult to expand the data table on a high-speed storage device such as a memory in order to tabulate and retrieve data.

(2) It is impossible to hold the data table in a form in which the respective item values are simultaneously sorted.

(3) An identical value appears in the data table many times.

On the other hand, in order to significantly improve speed of retrieval and tabulation of a large amount of data, the inventor has proposed a method of retrieving, tabulating, and sorting table format data and an apparatus for carrying out the method by providing a data management mechanism that has the function of the conventional data table and in which the problems of the data structure based on the data table are solved (see, for example, Patent Document 1).

The proposed method and apparatus for retrieving and tabulating table format data introduce a new data management mechanism usable in the usual computer system. In principle, this data management mechanism has a value management table and an array of pointers to the value management table.

FIG. 1 is a diagram for explaining the conventional data management mechanism. In the figure, a value management table 110 and an array of pointers 120 to the value management table are shown. The value management table 110 is a table in which, in an order of item value numbers that order item values belonging to items of table format data (represent the item values as integers) with respect to the respective items, item values (see reference numeral 111) corresponding to the item value numbers and classification numbers (see reference numeral 112) related to the item values are stored. The array of pointers 120 to the value management table is an array in which item value numbers of certain columns (i.e., items) of the table format data, that is, pointers to the value management table 110 are stored in an order of record numbers of the table format data.

By combining the array of pointers 120 to the value management table and the value management table 110, when a certain record number is given, it is possible to obtain an item value from the record number by extracting an item value number stored in association with the record number from the array of pointers 120 to the value management table concerning a predetermined item and, then, extracting an item value stored in association with the item value number in the value management table 110. Therefore, as in the conventional data table, it is possible to refer to all data (item values) using coordinates of record numbers (rows) and items (columns).

The data management mechanism including the value management table created for a certain item in the items of the table format data and the array of pointers to the value management table in this way may be specifically referred to as information block in the following explanation.

In the conventional data table, all data are integrally managed using coordinates consisting of rows corresponding to records and columns corresponding to items. On the other hand, this information block has a characteristic in that data are completely separated for each column of a table format, that is, for each item. According to this data management mechanism, since a large amount of data are separated for each item, it is possible to capture only data concerning items necessary for retrieval and tabulation onto a high-speed storage device such as a memory. As a result, time for access to the data is reduced. Thus, speed of processing for retrieval and tabulation is increased and, even in the case of data with an extremely large number of items, it is possible to treat the data without deteriorating performance.

In the case of this information block, the item values are stored in the value management table and the record numbers indicating positions where values are present are associated with the array of pointers to the value management table. Thus, it is unnecessary to arrange the item values in the order of the record numbers. Therefore, it is possible to sort data with respect to the item values to be suitable for retrieval and tabulation. This makes it possible to quickly judge whether an item value coinciding with a target value is present in the data. Moreover, since the item values correspond to the item value numbers, it is possible to treat even data, a character string, and the like with a long item value as an integer.

Moreover, according to this data management mechanism, all the item value numbers in the value management table 110 correspond to different item values. Thus, in extracting a record including an item value having a specific value, the number of times of comparison of the specific value and the item values required for the extraction is the number of kinds of the item values, that is, the number of item value numbers at the maximum. The number of times of a comparative operation is remarkably reduced and speed-up of retrieval and tabulation is realized. In that case, although a place for storing a result of checking whether a certain item value is relevant is necessary, for example, it is possible to use a classification number 112 as the storage place.

In FIG. 2, an information block including a value management table 210 consisting of an item value array 211 in which item values are stored, a classification number array 212 in which classification numbers are stored, and a presence number array 214 in which numbers of presence are stored is shown. In the presence number array 214, a number indicating how many item values concerning a certain item are present in all data, respectively, that is, the number of records having a predetermined item value is stored. By preparing such a presence number array 214 in the value management table 210, it is possible to immediately obtain information "what kinds of data (and how many data) are present" required in retrieval and tabulation. Thus, speed-up of retrieval and tabulation is realized.

However, even in such a data management mechanism, although the value list and the array of pointers, in particular, the array of pointers becomes extremely large in accordance with an increase in the number of records, a processable data amount is limited according to hardware resources used.

Processing of large-size data is also required in fields other than the information processing for the table format data described above. In these days when computers are installed in various places in the whole society and networks such as the Internet are spread, large-size data are accumulated here and there. Enormous calculations are required to process such large-size data. It is natural to attempt to introduce parallel processing for the calculations.

A parallel processing architecture is roughly classified into a "shared memory type" and a "distributed memory type". The former ("shared memory type") is a system in which plural processors share one huge memory space. In this system, since traffic between a processor group and a shared memory is a bottleneck, it is not easy to construct a realistic system using one hundred or more processors. Therefore, for example, in calculating a square root of one billion floating-point variables, an acceleration ratio for a single CPU is one hundred times at the most. Empirically, about thirty times is an upper limit.

In the latter ("distributed memory type"), respective processors have local memories and the local memories are united to construct a system. In this system, it is possible to design a hardware system including several hundred to several tens thousand processors. Therefore, it is possible to set the acceleration ratio for a single CPU in calculating a square root of one billion floating-point variables to several hundred to several tens thousand times.

Patent Document 1: International Publication No. WO00/10103 Pamphlet

Problems that the Invention is to Solve

However, there are also several problems in the parallel processing architecture of the "distributed memory type".

First problem: Shared management for a huge array

A first problem of the "distributed memory type" is a problem of shared management for data.

Huge data (since data is generally an array, the data will be hereinafter explained as an array) cannot be stored in a local memory owned by one processor. The huge data is inevitably subjected to shared management by plural local memories. It is evident that, unless an efficient and flexible shared management mechanism is introduced, various difficulties occur in developing and executing programs.

Second problem: Low efficiency of inter-processor communication

When each of the processors of the distributed memory type system attempts to access the huge array, although the processor can quickly access array elements on a local memory owned by the processor, inter-processor communication is indispensable for access to array elements owned by the other processors. It is said that this inter-processor communication has extremely low performance compared with communication with the local memory and requires at least 100 clocks. Consequently, when sort is carried out, since reference over the entire huge array is carried out and the inter-processor communication frequently occurs, performance markedly falls.

This problem will be more specifically explained. As of 1999, a personal computer is constituted as a "shared memory type" computer using one to several CPUs. A typical CPU used in this personal computer operates at an internal clock about five to six times as large as that of a memory bus, includes an automatic parallel execution function and an automatic pipeline processing function in the inside thereof, and can process approximately one data at one clock (memory bus).

Therefore, in a multiprocessor system of the "distributed memory type", since the number of processors is large, processing speed is one hundred times as low as that of a single processor (the shared memory type).

Third problem: Supply of a program

A third problem of the "distributed memory type" is a problem of how to supply a program to a large number of processors.

In a system for loading separate programs to an extremely large number of processors to cause all the processors to cooperatively operate (MIMD: Multiple Instruction Stream, Multiple Data Stream), a great deal of loads are required for creation, compilation, and distribution of the programs.

On the other hand, in a system for causing a large number of processors to operate with an identical program (SIMD: Single Instruction Stream, Multiple Data Stream), a degree of freedom of a program decreases and a situation in which a program producing a desired result cannot be developed is anticipated.

Therefore, it is an object of the invention to provide, in view of the problems of the conventional parallel architecture of the distributed memory type, an information processing method that is capable of realizing sort and tabulation of large-size data while holding the large-size data in individual processors and without sharing the large-size data among the processors in order to reduce the inter-processor communication as much as possible.

It is another object of the invention to provide, in an information processing system in which plural processing modules that have memories storing lists of ordered values, respectively, are logically connected in a ring shape, an information processing method of allocating order numbers, which are common among the plural processing modules, to values ordered separately for the respective processing modules in order to realize tabulation processing at high speed.

Moreover, it is an object of the invention to provide an information processing system that realizes the information processing method.

It is also an object of the invention to provide a program that is executed by a computer for realizing the information processing method.

Means for Solving the Problems

The invention adopts a parallel processing architecture of a distributed memory type in which a value list and an array of pointers, which are substantial elements of a table format data, are locally stored in individual processing modules and, rather than data themselves, indexes of order numbers (or orders) of the data are globally stored among plural processing modules. The invention also adopts an algorithm in which processing and communication are integrated to input and output and process data stored in various memories according to a single command.

SUMMARY OF THE INVENTION

The object of the invention is attained by an information processing method of tabulating item values stored in plural processing modules, in an information processing system in which the plural processing modules are logically connected in a ring shape and each of the processing modules includes a memory that stores table format data representing an array of records including the item values corresponding to an item of information, informs of a value list in which the item values are stored in an order of item value numbers corresponding to the item values and an array of pointers in which information for designating the item value numbers is stored in an order of the records, the information processing method comprising:

a step, in each of the processing modules, of storing in the memory global record numbers uniquely allocated to the records in the processing module among the plural processing modules and global item value numbers ordered with respect to item values in the processing module among the plural processing modules;

a step, in each of the processing modules, of sorting, in the processing module, the records in an order determined according to a set of global item value numbers of at least one or more designated items;

a step, in each of the processing modules, of storing a set of global item value numbers corresponding to the records in the memory, the set of global item value numbers being associated with dimension value numbers representing orders of the sorted records to the set of global item value numbers;

a step, in each of the processing modules, of mutually acquiring sets of global item value numbers from the other processing modules, counting a number of sets of global item value numbers ordered higher than the set of global item value numbers in the processing module, and allocating global dimension value numbers, which are common among the plural processing modules, to the sets of global item value numbers by increasing the dimension value number of the set of global item value numbers in the processing module by the counted number;

a step, in each of the processing modules, of calculating, for each of the sets of global item value numbers, a local tabulated value by tabulating item values of predetermined items of information in accordance with a predetermined rule; and a step, in each of the processing modules, of acquiring local tabulated values for each of the sets of global item value numbers from the other processing modules and calculating a tabulated value by tabulating the tabulated values acquired for each of the sets of global item value numbers.

According to the invention, it is possible to perform tabulation for the entire table format data at high speed according to sort processing in each of the processing modules, processing for allocating a global dimension value number, local tabulation processing, and local tabulation of tabulation results while keeping the value list of the table format data and the array of pointers subjected to shared management in each of the processing modules.

According to a preferred embodiment, the information processing method, after the step of calculating a tabulated value, further comprises a step, in each of the processing modules, of restoring a set of item values from the set of global item value numbers and creating a result table including the set of item values and the tabulated value corresponding to the set of item values. Consequently, since a tabulation result is held in a form of a table, it is possible to use the tabulation result for further tabulation.

Moreover, the object of the invention is attained by an information processing system that carries out the information processing method. The information processing system of the invention is an information processing system in which plural processing modules are logically connected in a ring shape and each of the processing modules includes a memory that stores table format data presenting an array of records including item values corresponding to an item of information, in forms of a value list in which the item values are stored in an order of item value numbers corresponding to the item values and an array of pointers in which information for designating the item value numbers is stored in an order of the records, wherein each of the processing modules stores, in the memory, global record numbers uniquely allocated to the records in the processing module among the plural processing modules and global item value numbers ordered with respect to item values in the processing module among the plural processing modules, and each of the processing modules includes:

local sort means for sorting, in the processing module, the records in an order determined according to a set of global item value numbers of at least one or more designated items;

dimension value numbering means for storing a set of global item value numbers corresponding to the records in the memory, the set of global item value numbers being associated with dimension value numbers in an order of the sorted records to the set of global item value numbers;

global dimension value numbering means for mutually acquiring sets of global item value numbers from the other processing modules, counting a number of sets of global item value numbers ordered higher than the set of global item value numbers in the processing module, and allocating global dimension value numbers, which are common among the plural processing modules, to the sets of global item value numbers by increasing the dimension value number of the set of global item value numbers in the processing module by the counted number;

tabulating means for calculating, for each of the sets of global item value numbers, a local tabulated value by tabulating item values of predetermined items of information in accordance with a predetermined rule; and global tabulating means for acquiring local tabulated values for each of the sets of global item value numbers from the other processing modules and calculating a tabulated value by tabulating the tabulated values acquired for each of the sets of global item value numbers.

According to a preferred embodiment, in this information processing system, each of the processing modules further includes means for restoring a set of item values from the set of global item value numbers and creating a result table including the set of item values and the tabulated value corresponding to the set of item values, the means being connected to the global tabulating means.

The object of the invention is attained by a program for causing a computer of a processing module in an information processing system to execute the following steps, in which plural processing modules are logically connected in a ring shape and each of the processing modules includes a memory that stores table format data representing an array of records including the item values corresponding to an item of information, in forms of a value list in which the item values are stored in an order of item value numbers corresponding to the item values and an array of pointers in which information for designating the item value numbers is stored in an order of the records, the steps comprising:

a step of storing, in the memory, global record numbers uniquely allocated to records in the processing module among the plural processing modules and global item value numbers ordered with respect to item values in the processing module among the plural processing modules;

a step of sorting, in the processing module, the records in an order set according to a set of global item value numbers of at least one or more designated items;

a step of storing a set of global item value numbers corresponding to the records in the memory, the set of global item value numbers being associated with dimension value numbers representing orders of the sorted records to the set of global item value numbers;

a step of mutually acquiring sets of global item value numbers from the other processing modules, counting a number of sets of global item value numbers ordered higher than the set of global item value numbers in the processing module, and allocating global dimension value numbers, which are common among the plural processing modules, to the sets of global item value numbers by increasing the dimension value number of the set of global item value numbers in the processing module by the counted number;

a step of calculating, for each of the sets of global item value numbers, a local tabulated value by tabulating item values of predetermined items of information in accordance with a predetermined rule; and a step, in each of the processing modules, of acquiring local tabulated values for each of the sets of global item value numbers from the other processing modules and calculating a tabulated value by tabulating the tabulated values acquired for each of the sets of global item value numbers.

In a preferred embodiment, the program, after the step of calculating a tabulated value, further causes the computer of the processing module to execute a step of restoring a set of item values from the set of global item value numbers and creating a result table including the set of item values and the tabulated value corresponding to the set of item values.

The further object of the invention is attained by an information processing method of allocating order numbers, which are common among plural processing modules, to values ordered individually in each of the processing modules in an information processing system in which the plural processing modules that have memories storing a list of the ordered values, respectively, are logically connected in a ring shape, the information processing method comprising:

a step, in each of the processing modules, of storing in the memory initial values of order numbers corresponding to the respective values in the list of values in the processing module;

a first transmission step, in each of the processing modules, of transmitting the list of values stored in the memory of the processing module to a processing module logically connected to the next stage;

a first update step, in each of the processing modules, of counting, with respect to the respective values in the list of values in the processing module, a number of values ordered higher than the respective values in a list of values received from a processing module logically connected to the preceding stage, updating the order numbers of the respective values in the list of values in the processing module by increasing the order numbers of the respective values in the list of values in the processing module by the counted number, and storing the order numbers updated in the memory;

a second transmission step, in each of the processing modules, of transmitting a further list of values to the processing module logically connected to the next stage, the further list of values being obtained by excluding values coinciding with the values in the list of values in the processing module from the values in the list of values received from the processing module logically connected to the preceding state;

a second update step, in each of the processing modules, of counting, with respect to the respective values in the list of values in the processing module, a number of values ordered higher than the respective values in the further list of values received from a processing module logically connected to the preceding stage, updating the order numbers of the respective values in the list of values in the processing module by increasing the order numbers of the respective values in the list of values in the processing module by the counted number, and storing the order numbers updated in the memory; and a step, in each of the processing modules, of repeatedly executing the second transmission step and the second update step until the list of values transmitted to the processing module logically connected to the next stage in the first transmission step is received by the processing module logically connected to the preceding stage via the other processing modules logically connected in a ring shape.

The further object of the invention is attained by an information processing system that realizes the information processing method. The information processing system according to the invention includes plural processing modules that have memories storing a list of ordered values, respectively, and a transmission path that logically connects the plural processing modules in a ring shape, the information processing system allocating order numbers, which are common among the plural processing modules, to the values in the list of values in each of the processing modules, wherein each of the processing modules includes:

initializing means for storing, in the memory, initial values of the order numbers of the respective values in the list of values in the processing module and transmitting the list of values stored in the memory of the processing module to a processing module logically connected to the next stage;

receiving means for receiving a list of values from a processing module logically connected to the preceding stage;

updating means for counting, with respect to the respective values in the list of values in the processing module, a number of values ordered higher than the respective values in the list of values received by the receiving means, updating the order numbers of the respective values in the list of values in the processing module by increasing the order numbers of the respective values in the list of values in the processing module by the counted number, and storing the order numbers updated in the memory;

transmitting means for transmitting a further list of values to the processing module logically connected to the next stage, the further list being obtained by excluding values coinciding with the values in the list of values in the processing module from the values in the list of values received by the receiving means; and control means for starting the initializing means and causing the receiving means, the updating means, and the transmitting means to repeatedly operate until the list of values transmitted by the initializing means is received by the processing module logically connected to the preceding stage via the other processing modules logically connected in a ring shape.

Moreover, the further object of the invention is attained by a program for causing a computer to execute the information processing method in an information processing system in which plural processing modules that have memories storing a list of ordered values, respectively, are logically connected in a ring shape. This program causes a computer of a processing module to execute:

a step of storing, in the memory, initial values of order numbers of the respective values in the list of values in the processing module;

a first transmission step of transmitting the list of values stored in the memory of the processing module to a processing module logically connected to the next stage;

a first update step of counting, with respect to the respective values in the list of values in the processing module, a number of values ordered higher than the respective values in a list of values received from a processing module logically connected to the preceding stage, updating the order numbers of the respective values in the list of values in the processing module by increasing the order numbers of the respective values in the list of values in the processing module by the counted number, and storing the order numbers updated in the memory;

a second transmission step of transmitting a further list of values to the processing module logically connected to the next stage, the further list being obtained by excluding values coinciding with the values in the list of values in the processing module from the values in the list of values received;

a second update step of counting, with respect to the respective values in the list of values in the processing module, a number of values ordered higher than the respective values in the further list of values received from a processing module logically connected to the preceding stage, updating the order numbers of the respective values in the list of values in the processing module by increasing the order numbers of the respective values in the list of values in the processing module by the counted number, and storing the order numbers updated in the memory; and a step of repeatedly executing the second transmission step and the second update step until the list of values transmitted to the processing module logically connected to the next stage in the first transmission step is received by the processing module logically connected to the preceding stage via the other processing modules logically connected in a ring shape.

ADVANTAGES OF THE INVENTION

According to the invention, it is possible to provide an information processing method and an information processing system that are capable of realizing extremely fast parallel processing by adopting a new data structure and a new parallel processing algorithm on the basis of a parallel processing architecture of a distributed memory type.

BRIEF DESCRIPTION OF THE DRAWINGS

FIG. 5 is a diagram for explaining an example of a table format data.

FIG. 7 is a diagram for explaining an example of a storage structure for table format data according to the embodiment of the invention.

FIG. 9 is a diagram for explaining a result of local sort processing.

FIG. 13 is a diagram for explaining a result of the global dimension value number allocation processing.

FIG. 14 is a diagram for explaining local tabulation processing according to the embodiment of the invention.

FIG. 17 is a diagram for explaining a global tabulation result calculation according to the embodiment of the invention.

FIG. 18 is a diagram for explaining overlap exclusion processing for a global tabulated value according to the embodiment of the invention.

FIG. 19 is a diagram for explaining result table creation processing according to the embodiment of the invention.

FIGS. 23A to 23D are diagrams for explaining the order number allocating method according to the embodiment of the invention, respectively.

FIGS. 24A to 24D are diagrams for explaining the order number allocating method according to the embodiment of the invention, respectively.

FIG. 25 is a diagram for explaining an example of a state at the time when compile processing ends.

FIG. 30 is a diagram for explaining an example of an accumulated number array.

FIG. 34 is a diagram for explaining an example of a result of the local sort processing in each of the PMMs.

FIGS. 35A to 35F are diagrams for explaining another embodiment of the local sort processing, respectively.

DETAILED DESCRIPTION OF THE INVENTION

Best Mode for Carrying Out the Invention

[Hardware Configuration]

Figure 1:
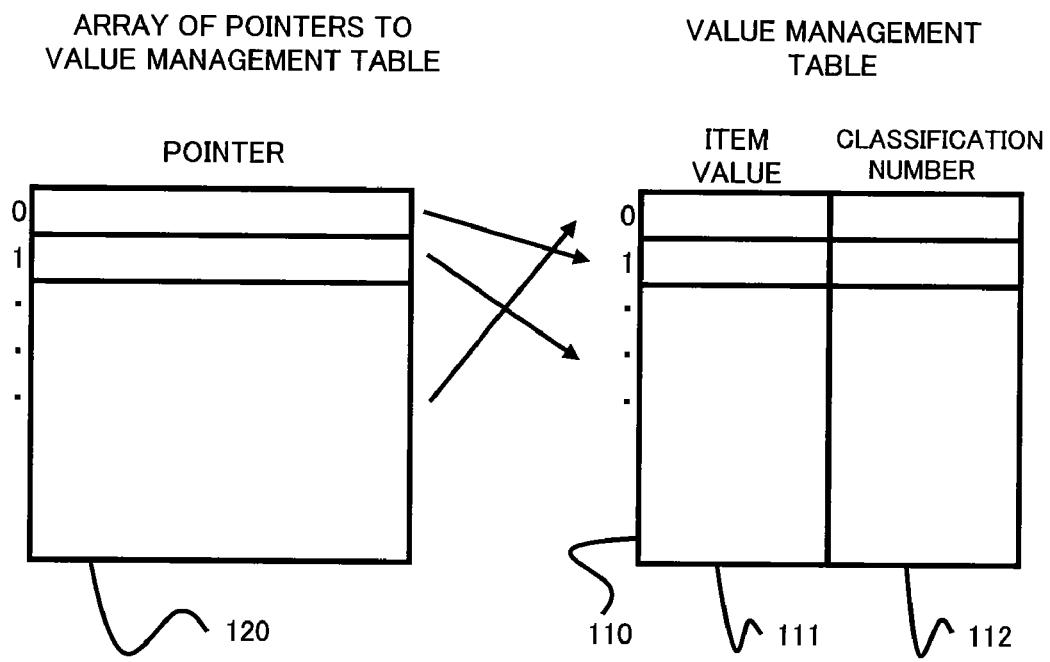
FIG. 1 is a diagram for explaining the conventional data management mechanism.
Figure 2:
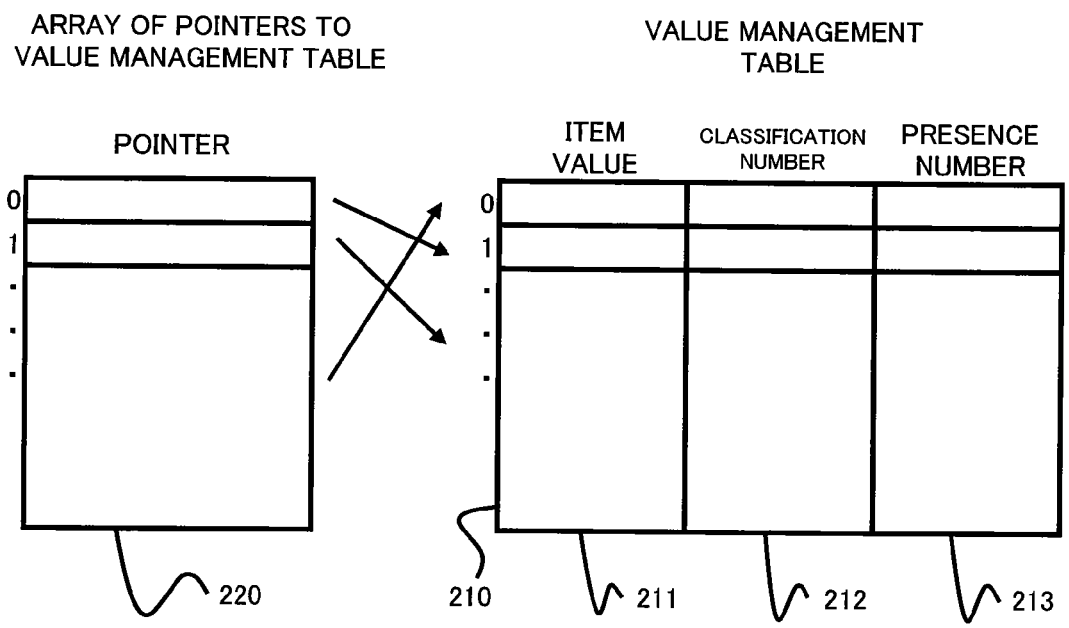
FIG. 2 is a diagram for explaining the conventional data management mechanism.
Figure 3:
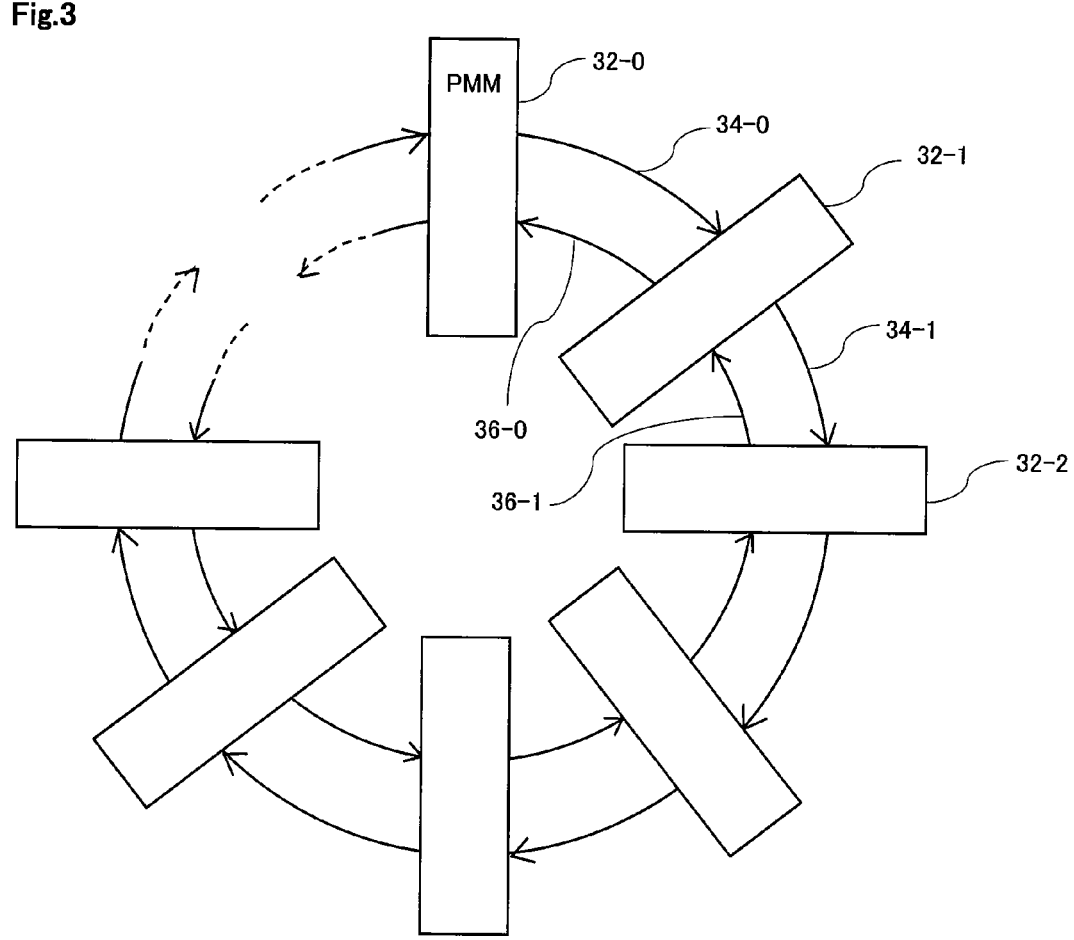
FIG. 3 is a block diagram schematically showing an information processing system according to an embodiment of the invention.

An embodiment of the invention will be hereinafter explained with reference to the accompanying drawings. FIG. 3 is a block diagram schematically showing an information processing system according to the embodiment of the invention. In this embodiment, a processing module is constituted by a memory module with a processor (hereinafter referred to as "PMM"). As shown in FIG. 3, in this embodiment, in order to logically connect plural processing modules in a ring shape, plural memory modules with processors PMM 32-0, PMM 32-1, PMM 32-2, and the like are arranged in a ring shape. A first bus (see, for example, reference numerals 34-0 and 34-1) for transmitting data clockwise and a second bus (see, for example, reference numerals 36-0 and 36-1) for transmitting data counterclockwise connect adjacent memory modules. In the first and the second buses, packet communication among the PMMs is executed. In this embodiment, transmission paths through which this packet communication is executed (packet transmission paths) are referred to as the first and the second buses.

In this embodiment, the PMMs are connected in a ring shape by the first bus for transmitting a packet clockwise on the one hand (first transmission path) and the second bus for transmitting a packet counterclockwise on the other (second transmission path). Such a constitution is advantageous because it is possible to uniformalize a delay time and the like of packet transmission.

A physical connection form among the processing modules is not limited to the form indicated in this embodiment. Any form may be adopted as long as the processing modules can be logically connected in a ring shape. For example, it is possible to adopt various connection forms such as a bus type and a star type.

Figure 4:
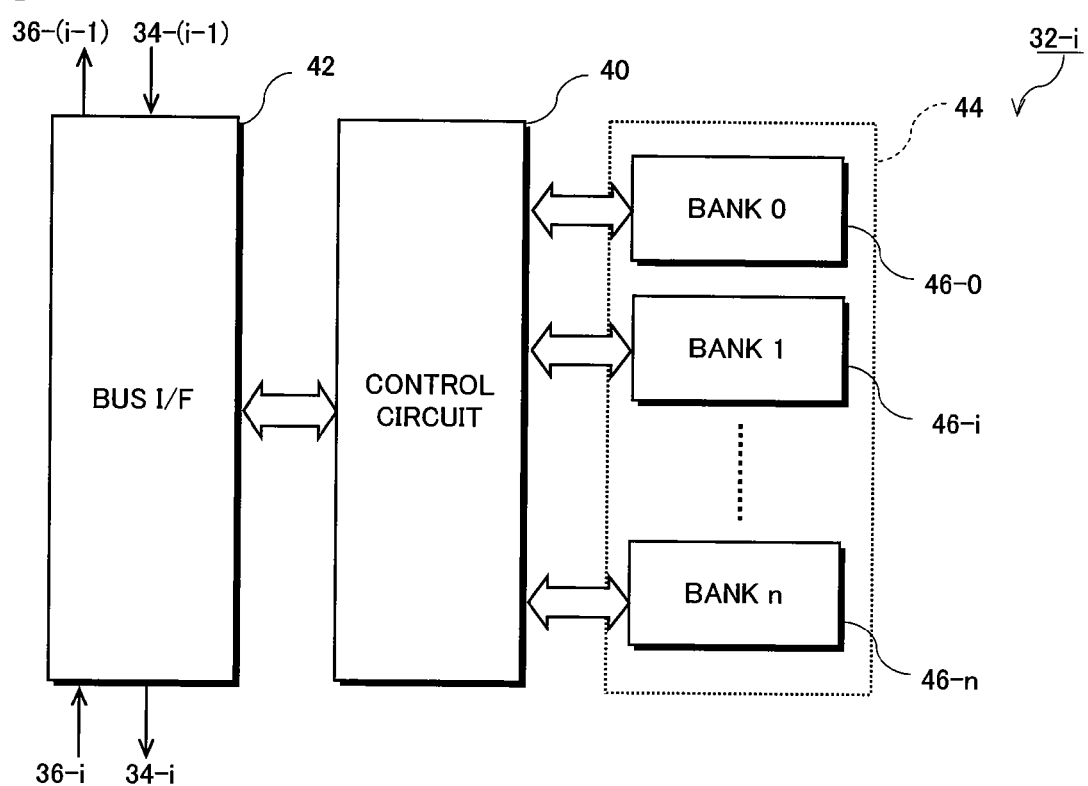
FIG. 4 is a diagram showing an example of a structure of a PMM according to the embodiment of the invention.

FIG. 4 is a diagram showing an example of a structure of the PMM 32. As shown in FIG. 4, each PMM 32-$i$ includes a control circuit 40 that controls access to a memory, execution of an arithmetic operation, and the like in accordance with a command common to the PMMs, a bus interface (I/F) 42, and a memory 44.

The memory 44 has plural banks BANK 0, 1, . . . , and n (reference numerals 46-0, . . . , 46-$n$) and can store a predetermined array described later in each of the banks.

The control circuit 40 is capable of exchanging data with other computers and the like on the outside. The other computers may be capable of accessing desired banks of the memory according to bus arbitration.

[Object of Tabulation Processing]

Tabulation in this embodiment means, for example, tabulating, for each certain item value (dimension value) of a certain item (dimension), item values (measures) of another item from table format data represented as an array of records including item values corresponding an item of information. The tabulation of measures means counting the number of measures, calculating a sum of measures, and calculating an average value of measures. The number of dimensions may be two or more. For example, FIG. 5 is a logical table format data of sex, age, and height of kindergarten children in a certain kindergarten. Processing for calculating a total value of height by sex and age is tabulation processing in this embodiment.

[Conventional Storage Structure of Data]

Figure 6:
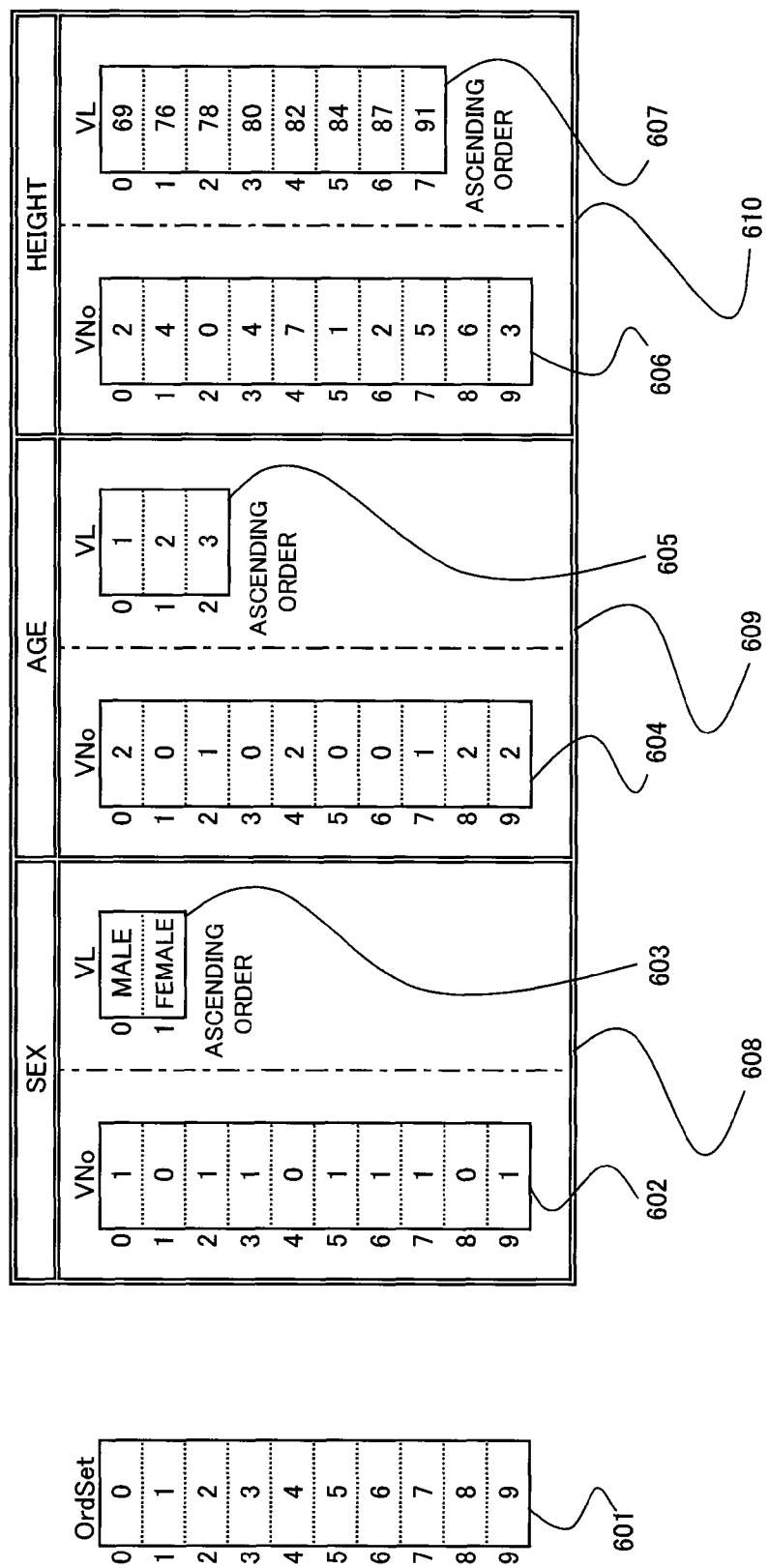
FIG. 6 is a diagram for explaining the conventional storage structure for table format data.

The table format data shown in FIG. 5 is stored in a single computer as a data structure shown in FIG. 6 by using the data management mechanism proposed in International Publication No. WO00/10103.

As shown in FIG. 6, in an array 601 (hereinafter abbreviated as "OrdSet") associating numbers of an arrangement order of respective records of the table format data and numbers of an arrangement order of internal data, arrangement order numbers of the internal data are arranged as values for each of the records of the table format. In this example, since all the table format data are represented as the internal data, the record numbers of the table format data and the arrangement order numbers of the internal data coincide with each other.

For example, concerning sex, it is seen from the array OrdSet 601 that an arrangement order number of the internal data corresponding to a record 0 of the table format data is "0". It is possible to acquire an actual value of sex concerning the record with the arrangement order number "0", that is, "male" or "female", by referring to an arrangement of pointers 602 (hereinafter abbreviated as "VNo") to a value list 603 (hereinafter abbreviated as "VL") obtained by sorting actual values in accordance with a predetermined order. In the pointer array 602, pointers indicating elements in the actual value list 603 are stored in accordance with an order of the arrangement order numbers stored in the array OrdSet 601. Consequently, it is possible to acquire an item value of sex corresponding to the record "0" of the table format data by (1) extracting an arrangement order number "0" corresponding to the record "0" from the array OrdSet 601, (2) extracting an element "1" corresponding to the arrangement order number "0" from the array of pointers 602 to the value list, and (3)

extracting an element "female" indicated by the element "1" extracted from the array of pointers 602 to the value list from the value list 603.

It is also possible to acquire item values with respect to the other records and concerning age and height in the same manner.

In this way, the table format data is represented by a combination of the value list VL and the array of pointers VNo to the value list. This combination is specifically referred to as "information block". In FIG. 6, information blocks concerning sex, age, and height are indicated as information blocks 608, 609, and 610, respectively.

If the single computer has a single memory (plural memories may be physically provided but, in a sense that a memory is arranged in a single address space and accessed, the memory is a single memory), the array OrdSet of an order set and the value list VL and the array of pointers VNo forming the respective information blocks only have to be stored in the memory. In order to hold a large quantity of records, since a memory capacity also increases according to a size of the memory, it is desirable that the array OrdSet, the value list VL, and the array of pointers VNo are distributedly arranged. From the viewpoint of parallelization of processing, it is also desirable that the information distributedly arranged can be shared and grasped.

Thus, in this embodiment, the plural PMMs share and grasp data of records without overlapping one another and high-speed tabulation is realized by packet communication among the PMMs.

[Data Storage Structure According to this Embodiment]

Figure 7:
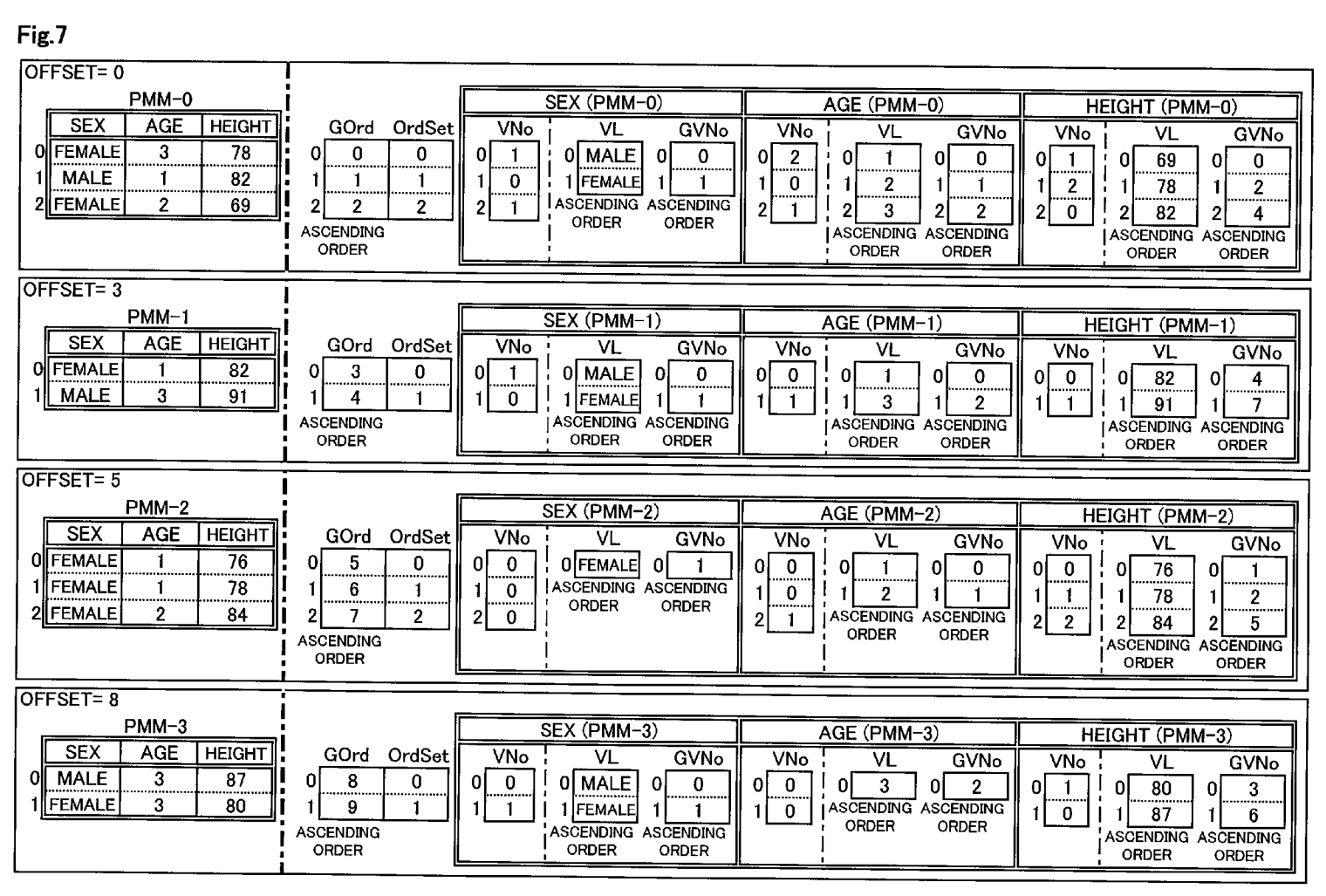

FIG. 7 is a diagram for explaining a data storage structure according to this embodiment. In the figure, as an example, the table format data indicated by FIGS. 5 and 6 are distributedly arranged in four processing modules PMM-0, PMM-1, PMM-2, and PMM-3 and shared and grasped. For convenience of explanation, the number of processing modules is four. However, the invention is not limited by the number of processing modules.

In this embodiment, in order to make it possible to uniquely order a record shared and grasped by each of the PMMs in all records grasped by the four PMMs, namely, PMM-0 to PMM-3, a global record number is uniquely allocated to each of the records. In FIG. 7, the global record number is represented as "GOrd". This global record number GOrd indicates in which position in all the records each element of the array OrdSet in each of the PMMs is placed. The array OrdSet is set to be order storage mapping from the entire data to the inside of each of the PMMs. Thus, GOrd may be in an ascending order. In each of the PMMs, a size of the GOrd array (=global order set array) coincides with a size of the OrdSet array (the order set array).

Moreover, in this embodiment, a global item value number for indicating in which position in the item values grasped by all the PMMs each item value shared and grasped by each of the PMMs, that is, each value in the value list VL is placed is provided. In FIG. 7, this global item value number is indicated as "GVNo". Since the values in the value list VL are arranged in an order of the values (e.g., an ascending order or a descending order), the global item value number GVNo is also set in an ascending order (or a descending order). A size of the array GVNo coincides with a size of the array VL. It is possible to integrate tabulation results in each of the processing modules into one as a whole by identifying in which position in all the item values an item value individually grasped by each of the processing modules is placed.

In FIG. 7, a value OFFSET allocated to each of the PMMs is an offset value for indicating to which record in the integrated records shown in FIG. 6 a top record subjected to shared control by the PMM corresponds to. As described above, the array OrdSet of each of the PMMs is set to be order storage mapping from the entire data to the inside of each of the PMMs. Thus, a value obtained by totaling this offset value OFFSET and a value of an element of the array OrdSet in the PMM coincides with the global record number GOrd. Preferably, this offset value is notified to each of the PMMs and each of the PMMs can determine a global record number on the basis of this offset value OFFSET.

The global record number GOrd and the global item value number GVNo of each of the PMMs can be calculated on the outside of each of the PMMs and set in each of the PMMs in advance. However, each of the PMMs itself is capable of setting the global record number GOrd and the global item value number GVNo according to compile processing described later.

[Tabulation Processing]

Tabulation processing according to this embodiment will be explained. A tabulation algorithm according to this embodiment is constituted such that the same processing can be executed in all processing modules. This tabulation algorithm is also constituted such that, by allocating a single tabulation processing instruction to plural processing modules, the plural processing modules can operate in parallel and execute tabulation processing. Since all the processing modules execute the same operation, it is possible to realize parallel processing simply by creating one program.

The tabulation algorithm in this embodiment allocates global dimension value numbers, which are common among all the processing modules, to dimension values for tabulation, tabulates measures for each dimension value number in each of the processing modules, and finally tabulates the measures globally, that is, commonly among all the processing modules. Therefore, according to the tabulation algorithm in this embodiment, a value list and an array of pointers to the value list are locally held in each of the processing modules. According to this tabulation algorithm, the value list and the array of pointers are not held in common among the plural processing modules but a reference, that is, an order of dimension values, is globally held among the plural processing modules. As a result, the plural processing modules are prevented from accessing memories one another in order to acquire data necessary for tabulation and only data necessary for determining an order of dimension values are communicated among the processing modules. Thus, a communication amount is reduced and speed-up of processing is realized.

Figure 8:
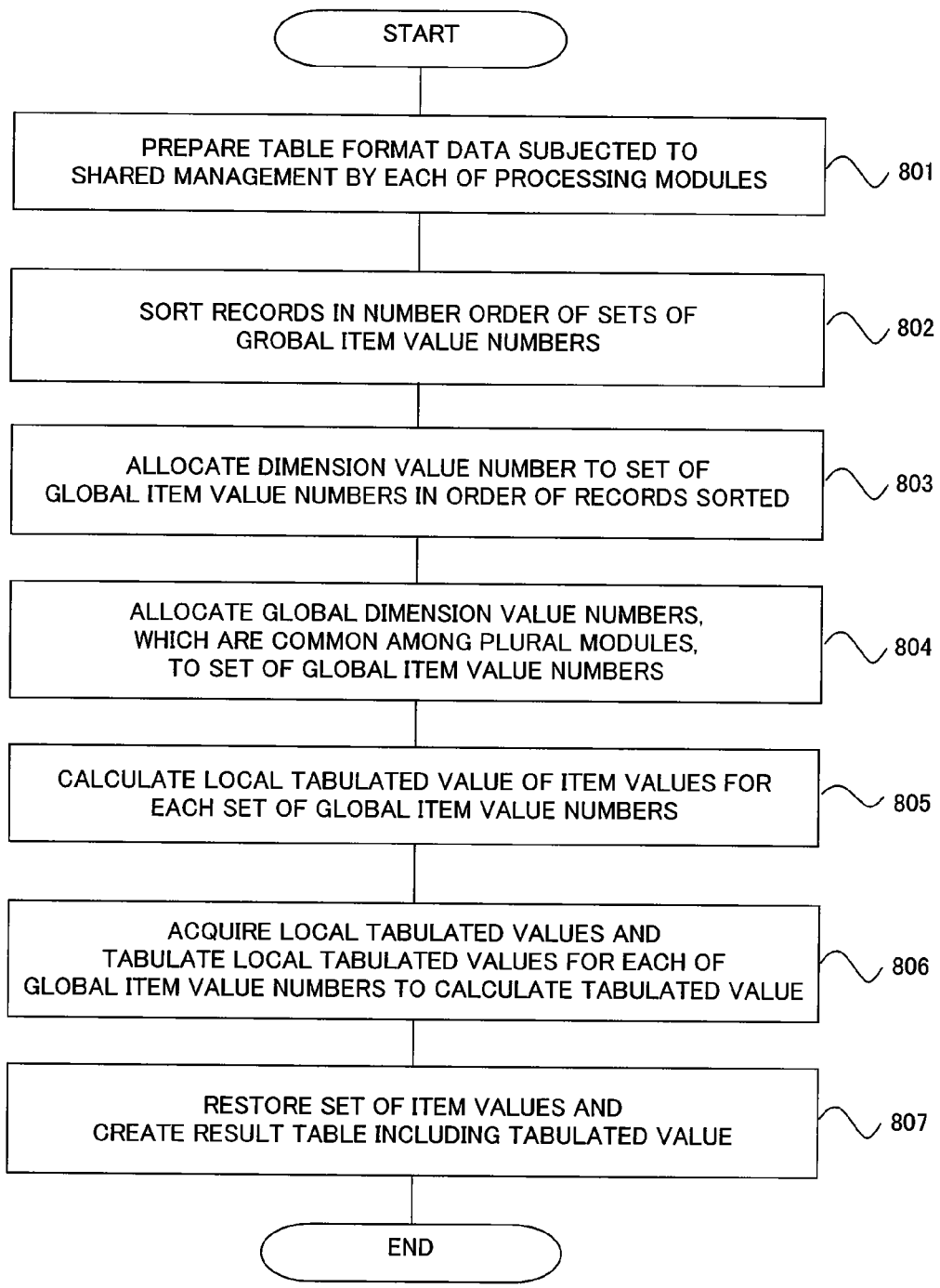
FIG. 8 is a flowchart of tabulation processing according to the embodiment of the invention.

FIG. 8 is a flowchart of the tabulation processing according to this embodiment. As shown in FIG. 8, first, a table format data subjected to shared management by each of the processing modules is prepared (step 801). More specifically, each of the processing modules stores, in the memory, global record numbers uniquely allocated to the records in the processing module among the plural processing modules and global item value numbers ordered with respect to item values in the processing module among the plural processing modules.

Each of the processing modules sorts, in the processing module, the records in an order of numbers of a set of the global item value numbers of at least one or more dimensions of designated items (step 802).

Moreover, each of the processing modules stores the set of the global item value numbers corresponding to the records in the memory by allocating dimension value numbers in an order of the records sorted (step 803).

Each of the processing modules mutually acquires sets of global item value numbers from the other processing modules, counts the number of sets ordered higher than the set of the global item value numbers in the processing module, and allocates global dimension value numbers, which are common among the plural processing modules, to the set of global item value numbers by increasing the dimension value numbers of the set of the global item value numbers in the processing module by the number counted (step 804).

Subsequently, each of the processing modules calculates, for each set of the global item value numbers, a local tabulated value by tabulating item values of items of predetermined information in accordance with a predetermined rule (step 805).

Finally, each of the processing modules acquires a local tabulated value for each set of the global item value numbers from the other processing modules and calculates a tabulated value by tabulating tabulated values acquired for each set of the global item value numbers (step 806).

After step 806 of calculating a tabulated value, each of the processing modules can restore sets of item values from the sets of the global item value numbers and create a result table including the sets of the item values and tabulated values corresponding to the sets of the item values (step 807). Since this result table itself is held in a form of a table, it is possible to easily obtain tabulation concerning another dimension by further tabulating this table. For example, it is possible to easily create a tabulation result of sex from tabulation results obtained by sex and age.

The tabulation processing according to this embodiment will be explained more in detail on the basis of the table format data shown in FIG. 5. For example, when the table format data shown in FIG. 5 is subjected to shared management by plural processing modules to execute step 801 described above, the storage structure of data shown in FIG. 7 is obtained.

Tabulation processing for "calculating a total value of height by sex and age" is applied to the data shown in FIG. 7. The sex and the age are dimensions and the height is a measure.

In step 802, with respect to the data shown in FIG. 7, in each of the processing modules, that is, each of local environments, records of each of the local environments are sorted concerning two dimensions, namely, the dimension "age" and the dimension "sex". When the sort is performed in two or more dimensions, the sort is performed stepwise in an order of appropriate dimensions. In general, since replacement of orders following the sort occurs more frequently as the number of kinds of item values is larger. Thus, it is more efficient to sort dimensions in order from a dimension with the largest number of kinds of item values. In this example, when the sex and the age are compared, since the number of kinds of item values of the age (there kinds including one year old, two years old, and three years old) is larger than the number of kinds of item values of the sex (two kinds including male and female), the sort is performed in an order of the age and the sex.

In this embodiment, the sort under the local environment is equivalent to replacement of orders of elements of the array OrdSet of the arrangement order numbers. For example, it is assumed that elements of an array of arrangement order numbers at an initial stage are 0 (i.e., a record 0), 1 (i.e., a record 1), and 2 (i.e., a record 2) and a value of age of the record 0 is 3 years old, a value of age of the record 1 is 1 year old, and a value of age of the record 2 is 2 years old. When the records are rearranged in order from one with a smallest age, the records are arranged in an order of the record 1, the record 2, and the record 3. A sort result at this point is represented by replacing an array of arrangement order numbers with an order of 1, 2, and 0. For later processing, an order after this local sort is set in the array OrdSet of the arrangement order numbers.

FIG. 9 is a diagram showing a result obtained by sequentially applying sort by age and sort by sex to the data shown in FIG. 7 in each of the processing modules. In FIG. 9, for simplification of illustration, an information block concerning height is not shown. The sort by age is performed in an order from a record with a smallest age and the sort by sex is performed in an order of male and female. According to this local sort, the records in the PMM-0 are ordered in an order of a record 1 (male, 1 year old, 82 cm), a record 2 (female, 2 years old, 69 cm), and a record 0 (female, 3 years old, 78 cm), the records in the PMM-1 are ordered in an order of a record 1 (male, 3 years old, 91 cm) and a record 0 (female, 1 year old, 82 cm), the records in the PMM-2 are ordered in an order of a record 0 (female, 1 year old, 76 cm), a record 1 (female, 1 year old, 78 cm), and a record 2 (female, 2 years old, 84 cm), and the records in the PMM-3 are ordered in an order of a record 0 (male, 3 years old, 87 cm) and a record (female, 3 years old, 80 cm). This local sort will be described later.

Figure 10:
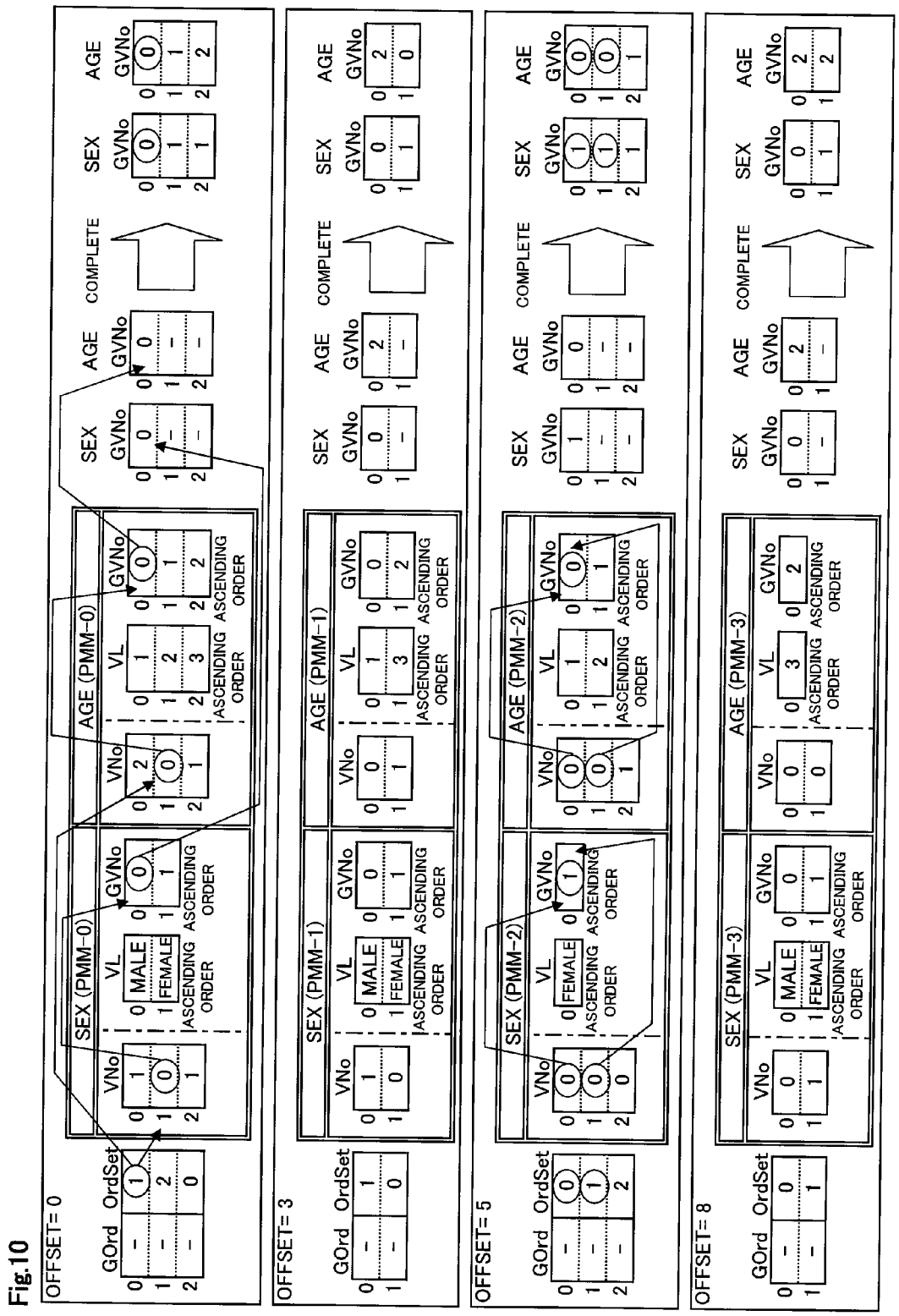
FIG. 10 is a diagram for explaining order number allocation processing according to the embodiment of the invention.

In step 803, each of the processing modules allocates order numbers to the set of the item value numbers of the dimensions selected (in this example, sex and age) in the order of records locally sorted (i.e., the order of the elements of the array OrdSet of the arrangement order numbers after replacement). FIG. 10 is a diagram for explaining allocation of order numbers in this example. For simplification of illustration, an information block concerning height is omitted.

Explaining about the record 1 of the PMM-0, a value number of sex is "0" and a global item value number corresponding to the value number "0" is "0". A value number of age is "0" and a global item value number corresponding to the value number of age "0" is "0". Thus, a set of item value numbers corresponding to the record 1 in the PMM-1 is (0, 0) and an order number is allocated to this (0, 0) in an order of records locally sorted. It is possible to internally realize allocation of an order number to a set of item value numbers by giving the identical order number "0" to a global item value number of sex and a global item value number of age. In this example, since the record 1 in the PMM-0 is a first record locally sorted, the order number "0" is allocated to the set of item value numbers (0, 0) corresponding thereto. Since records in the PMM-0 are ordered in an order of the record 1, the record 2, and the record 0, an order number "1" is given to a set of global item value numbers (1, 1) corresponding to the record 2 and an order number "2" is given to a set of global item value numbers (1, 2) corresponding to the record 0.

Figure 11:
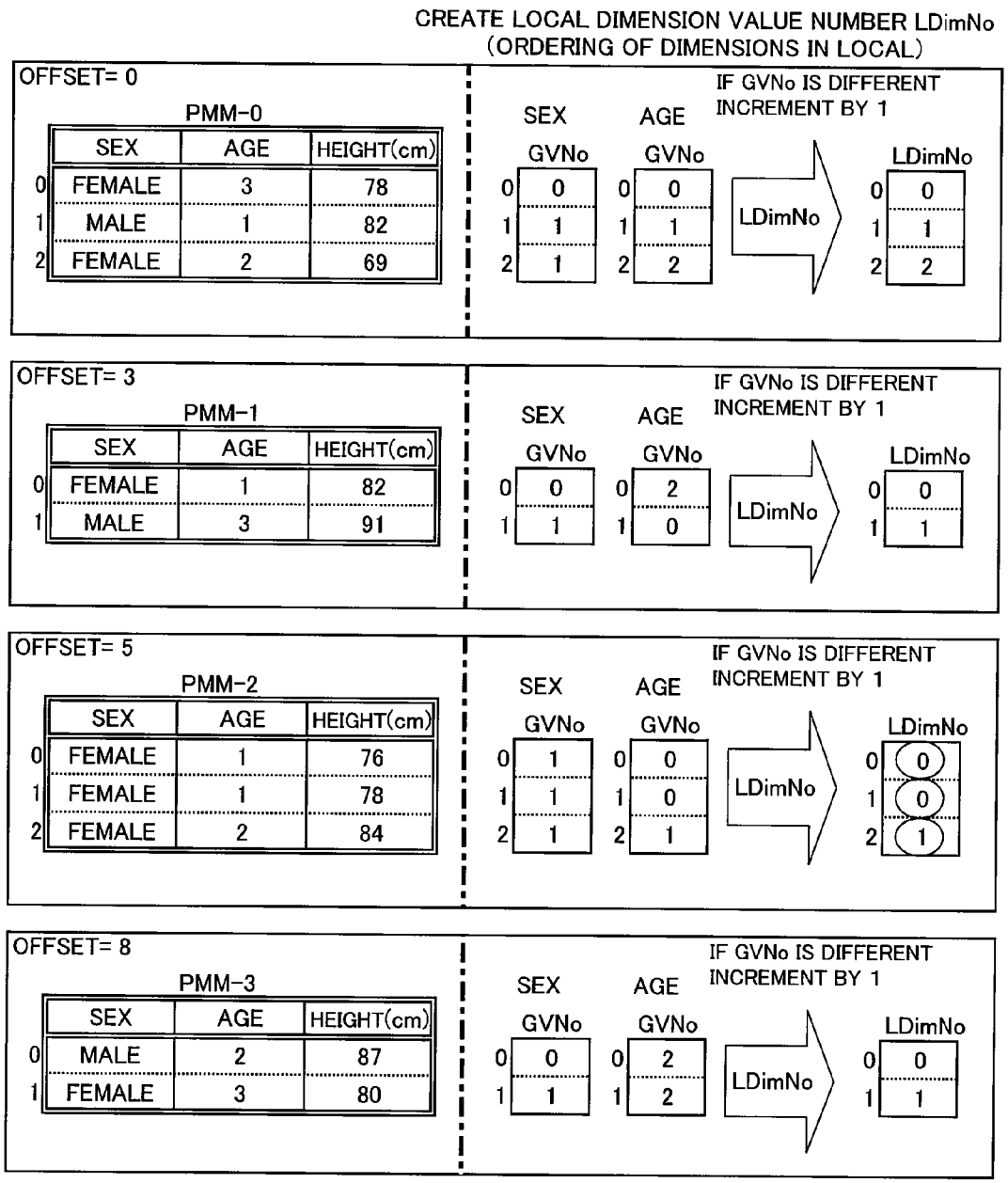
FIG. 11 is a diagram for explaining local dimension value number allocation processing according to the embodiment of the invention.

Since an order number is set in association with a record, when there are two or more records having an identical dimension value in a PMM, different order numbers are allocated to the records. For example, in FIG. 10, sex is female and age is 1 year old in both the record 0 and the record 1 in the PMM-2. Thus, a set of global item value numbers is (0, 1) in both the record 0 and the record 1. When an object is retrieval or sort, even if sets of global value numbers are identical, it is necessary to treat different records separately. For example, it is possible to treat all records separately by using a set of global value numbers and the global record number GOrd in combination. However, when an object is tabulation as in this example, it is convenient to treat records having an identical set of global item value numbers, that is, records having an identical dimension value, as the same dimension. Therefore, in this embodiment, an order number is reallocated such that the same number is allocated to records having an identical set of global item value numbers. The order number reallocated in this way will be hereinafter referred to as a local dimension value number LDimNo. The local dimension value number is a number that is incremented one by one only when sets of global item value numbers are different. FIG. 11 is a diagram for explaining allocation of such a local dimension value number. In this example, order numbers and local dimension value numbers are the same in the PMM-0, the PMM-1, and the PMM-3. However, in the PMM-2, local dimension value numbers are "0", "0", and "1" in an order of records sorted.

In step 804, each of the processing modules applies global ordering to dimension values by converting the local dimension value number LDimNo allocated to the set of global item value numbers into a global dimension value number GDimNo that is common among the plural processing modules. When the global ordering is applied to the dimension values, as described later, it is possible to obtain an overall tabulation result by performing tabulation for each of the dimension values in each of the processing modules and, then, integrating results of the tabulation.

Figure 12:
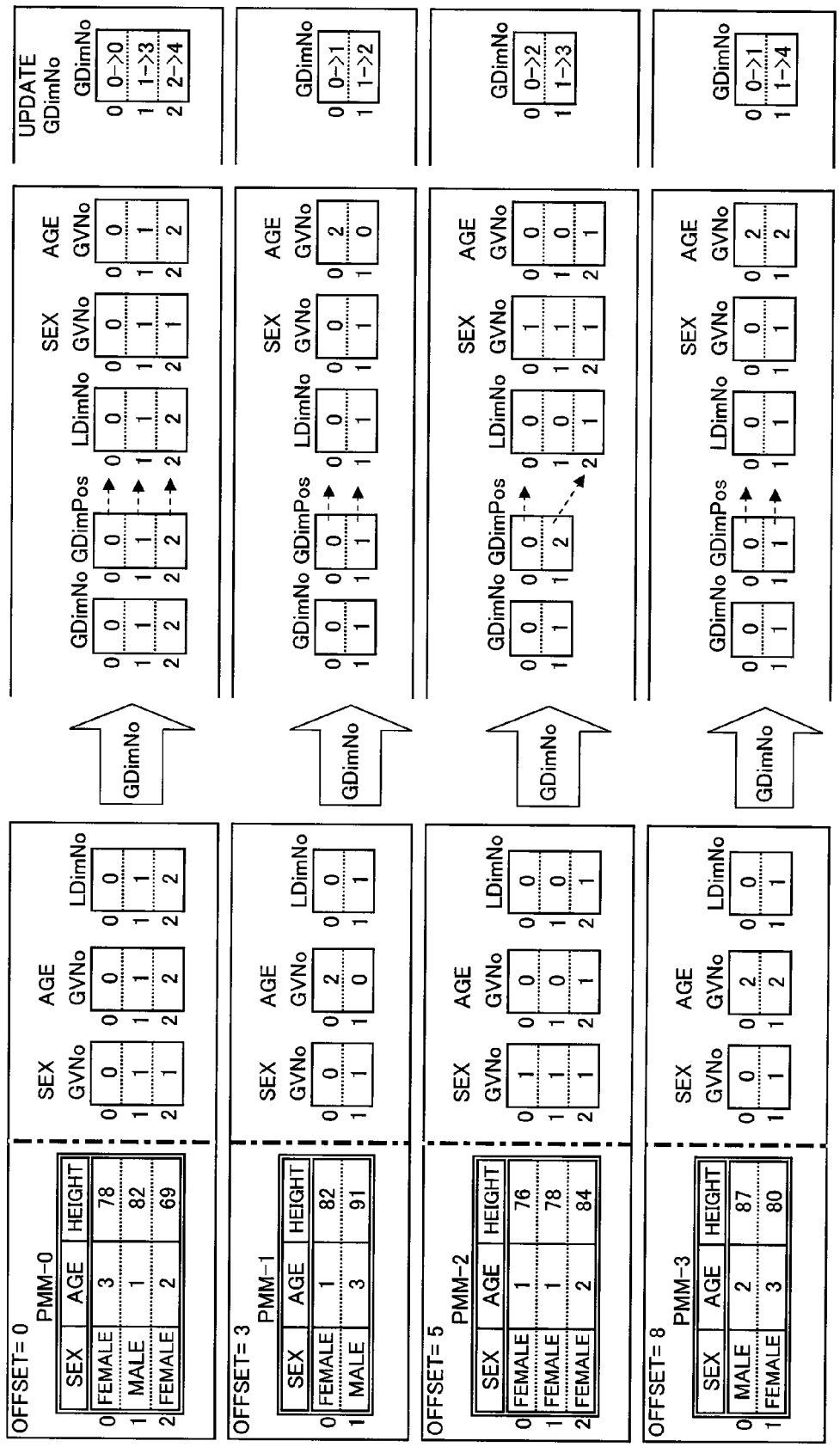
FIG. 12 is a diagram for explaining global dimension value number allocation processing according to the embodiment of the invention.

FIG. 12 is a diagram for explaining allocation of a global dimension value number. The allocation of a global dimension value number means ordering a set of global item value numbers, which are ordered in each of the processing modules, in common among the plural processing modules. Therefore, each of the processing modules secures an area of the global dimension value number GDimNo and creates an initial value of the global dimension value number GDimNo from the local dimension value number LDimNo. Only an area of one global dimension value number GDimPos is secured for records to which the same local dimension value number LDimNo is allocated. Therefore, a correspondence table GDimPos of correspondence from the global dimension value number GDimNo to the local dimension value number LDimNo is also simultaneously created.

Each of the processing modules mutually acquires sets of global item value numbers from the other processing modules, counts the number of sets ordered higher than the set of global item value numbers in the processing module, and allocates global dimension value numbers, which are common among the plural processing modules, to the sets of global item value numbers by increasing the global dimension value number of the set of global item value numbers in the processing module by the number counted. In this way, a method of allocating order numbers common among the plural processing modules, that is, global dimension value numbers, to values ordered individually in each of the processing modules, that is, local dimension value numbers is required to exclude overlapping of an identical value in order to prevent distinct global dimension value numbers from being allocated to the identical value. This order number allocating method will be described later.

FIG. 13 is a table in which the local dimension value number LDimNo, a global item value number of sex GVNo1, a global item value number of age GVNo2, and the global dimension value number GDimNo in the processing modules PMM-0 to PMM-3 according to the example in FIG. 12 are compiled. As it is seen from the figure, numbers 0, 1, 2, and 4 are allocated to the global dimension value number GDimNo in an order of numbers of sets of global item value numbers at the time when the global item value number of sex GVNo1 is set as a high order digit and the global item value number of age GVNo2 is set as a low order digit.

In step 805, each of the processing modules tabulates, in the processing module, item values for each set of global item value numbers, that is, for each global dimension value number. In this example, in the PMM-0 to the PMM-3, values of height are totaled by sex and age in each of the modules.

Figure 15:
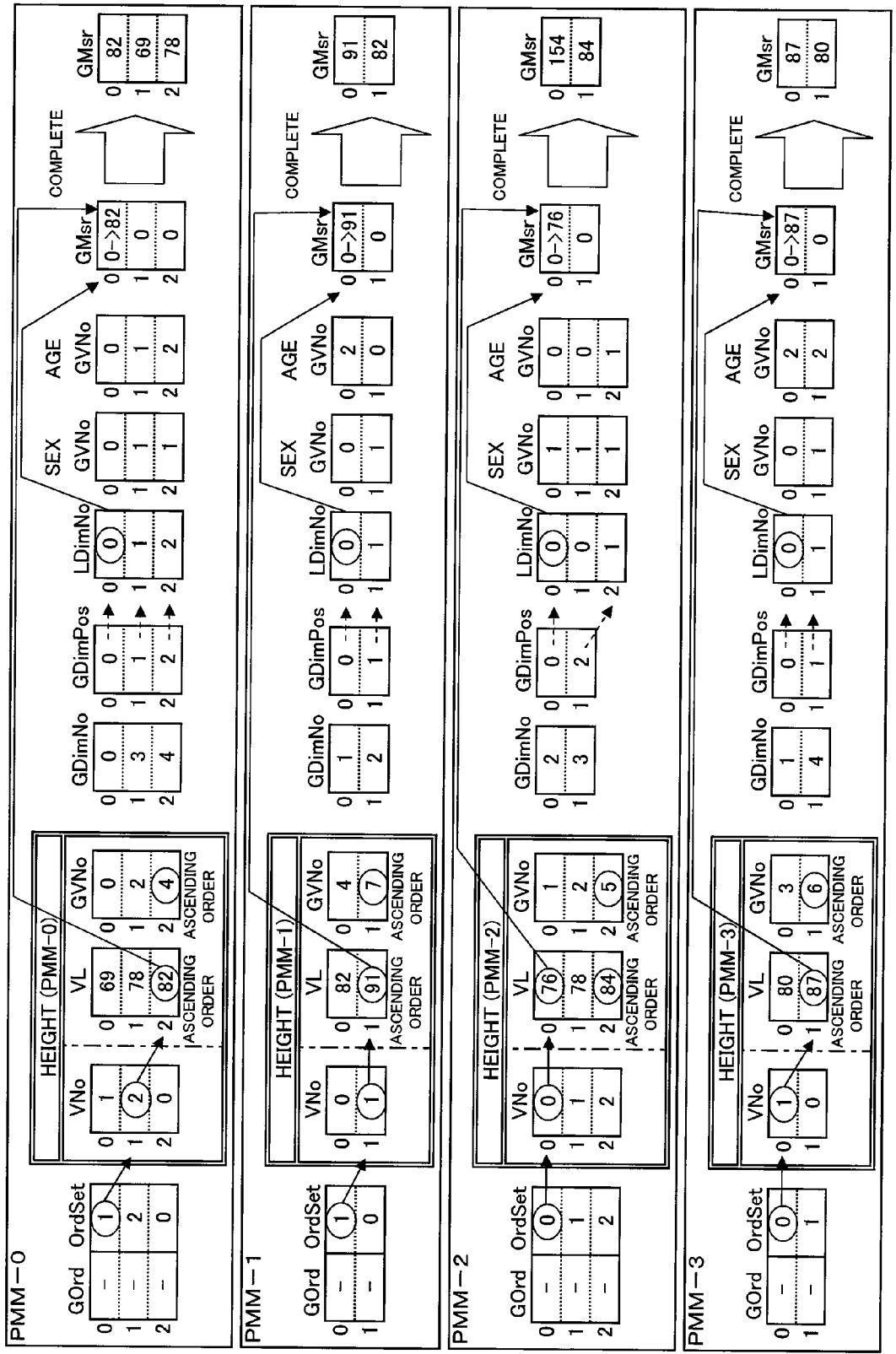
FIG. 15 is a diagram for explaining the local tabulation processing according to the embodiment of the invention.

FIGS. 14 and 15 are diagrams for explaining processing for tabulating, in each of the processing modules, item values for each global dimension value number. First, as shown in FIG. 14, an array GMsr having the same size as the array of the global dimension value number GDimNo is created as an area for storing measures. In this example, since a total of height is tabulated, a storage area of a floating point, an integer, or the like is created. Subsequently, as shown in FIG. 15, in each of the processing modules, for example, item values that should be tabulated are extracted in an order of elements of the array OrdSet replaced in an order of sets of global dimension value numbers. The item values are tabulated in the measure array GMsr.

For example, in the PMM-0, since it is seen that an element at the top of the array OrdSet of arrangement order numbers is No. "1" (i.e., the record 1), content of an index "1" of the array of pointers VNo to the value list in the information block of height is referred to. Since a value "2" is stored in the array of pointers, a value of height concerning the record 0 of the PMM-0 is obtained as "82" by acquiring content of an index "2" of the value list VL. This value "82" is a value that should be tabulated in the measure array GMsr. In this example, since a tabulated value is a total value, this value "82" is added.

It is necessary to specify an element of the measure array GMsr to which this value "82" should be added, that is, an index of the measure array GMsr. As described above, since an array of the local dimension value number LDimNo is arranged in an order of the set of global dimension value numbers, the array OrdSet of arrangement order numbers and an arrangement order of elements of the array LDimNo of local dimension value numbers, that is, indexes correspond to each other. Therefore, a measure concerning the top of the array OrdSet only has to be tabulated in the storage area of the measure array GMsr indicated by the top of the array LDimNo. In the example in FIG. 15, since an element at the top of the array LDimNo corresponding to the top of the array OrdSet is "0", the value "82" is added to a place indicated by the index "0" of the measure array GMsr.

Concerning the PMM-1, the PMM-2, and the PMM-3, similarly, values of height "91", "76", and "87" are acquired for the element at the top of the array OrdSet and tabulated in the area at the top of the measure array GMsr. Concerning the PMM-0 to the PMM-3, item values are acquired and tabulated in the measure array GMsr in the same manner for second and subsequent elements of the array OrdSet.

In the PMM-2, since the local dimension value number LDimNo is "0" for both the element "0" at the top and the second element "1" of the array OrdSet, both values of height "76" and "78" corresponding thereto are tabulated in the area at the top of the measure array GMsr. Thus, a result of tabulation at the top of the array GMsr is 76+78=154.

Subsequently, in step 806, each of the processing modules acquires local tabulated values for each set of global item value numbers from the other processing modules and calculates a tabulated value by tabulating, for each set of global item value numbers, the tabulated values acquired. It is possible to realize this global tabulation in, for example, two kinds of methods according to a constitution of a physical transmission path among the processing modules.

Figure 16:
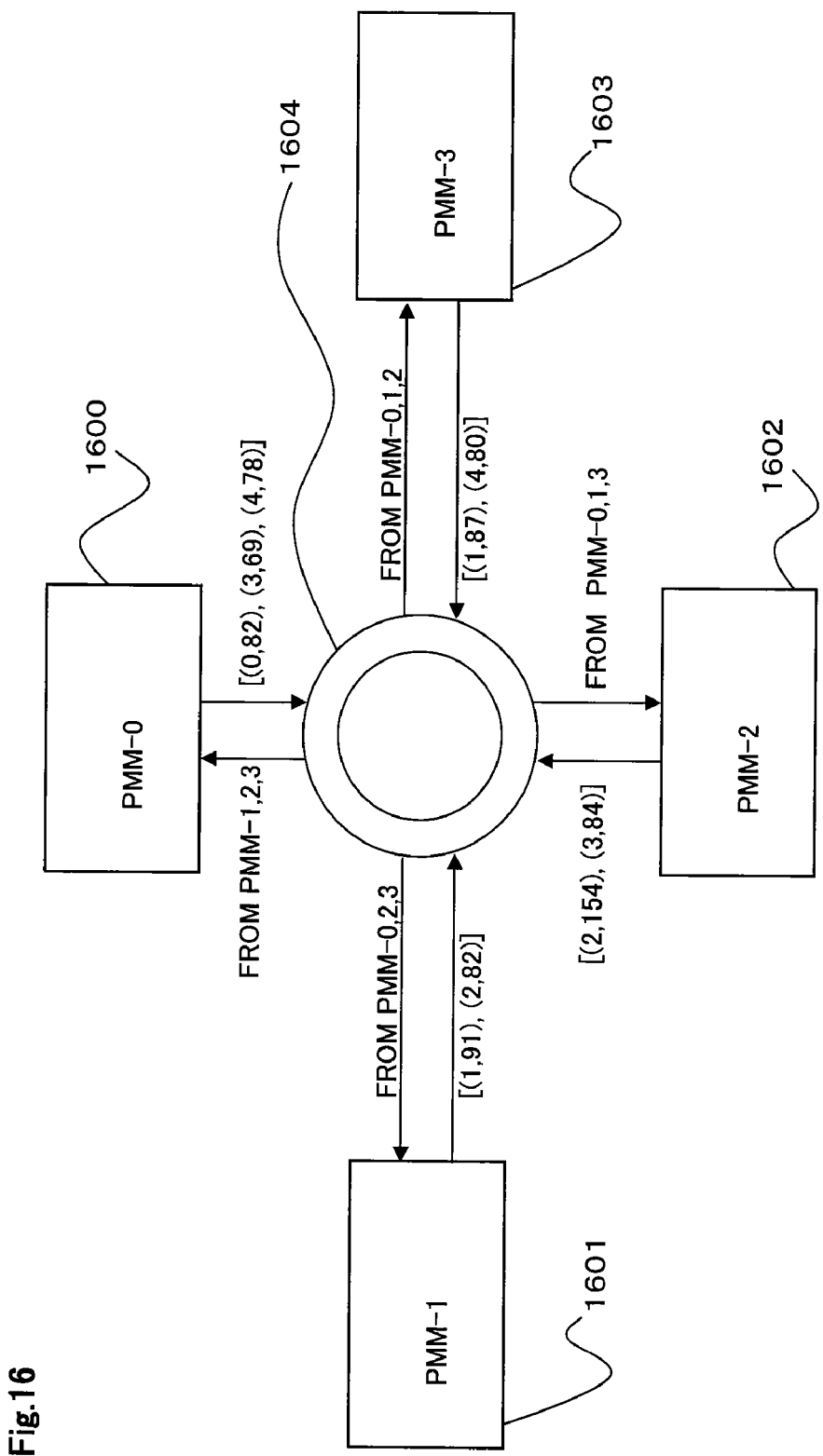
FIG. 16 is a diagram for explaining a first global tabulation method according to the embodiment of the invention.

In a first global tabulation method, each of the processing modules transmits a set of the global dimension value number GDimNo and the measure GMsr tabulated in association with the global dimension value number GDimNo to the other processing modules. This method is suitable when it is possible to secure plural transmission paths among the processing modules. FIG. 16 is a diagram for explaining the first global tabulation method. The four processing modules, the PMM-0 (reference numeral 1600), the PMM-1 (reference numeral 1601), the PMM-2 (reference numeral 1602), and the PMM-3 (reference numeral 1603), are connected via a transmission path denoted by reference numeral 1604 as a whole.

For example, the processing module PMM-0 transmits, as a result of tabulation under a local environment shown in FIG. 15, three sets of the global dimension value number GDimNo and the measure GSMsr, that is, (0, 82), (3, 69), and (4, 78), to the other processing modules PMM-1, PMM-2, and PMM-3. The processing module PMM-0 receives, via the transmission path 1604, two sets (1, 91) and (2, 82) transmitted from the processing module PMM-1, two sets (2, 154) and (3, 84) transmitted from the processing module PMM-2, and two sets (1, 87) and (4, 80) transmitted from the processing module PMM-3. The processing modules PMM-1, PMM-2, and PMM-3 transmit local tabulation results of the processing modules to the other modules and receive local tabulation results from the other processing modules in the same manner.

Figure 17:
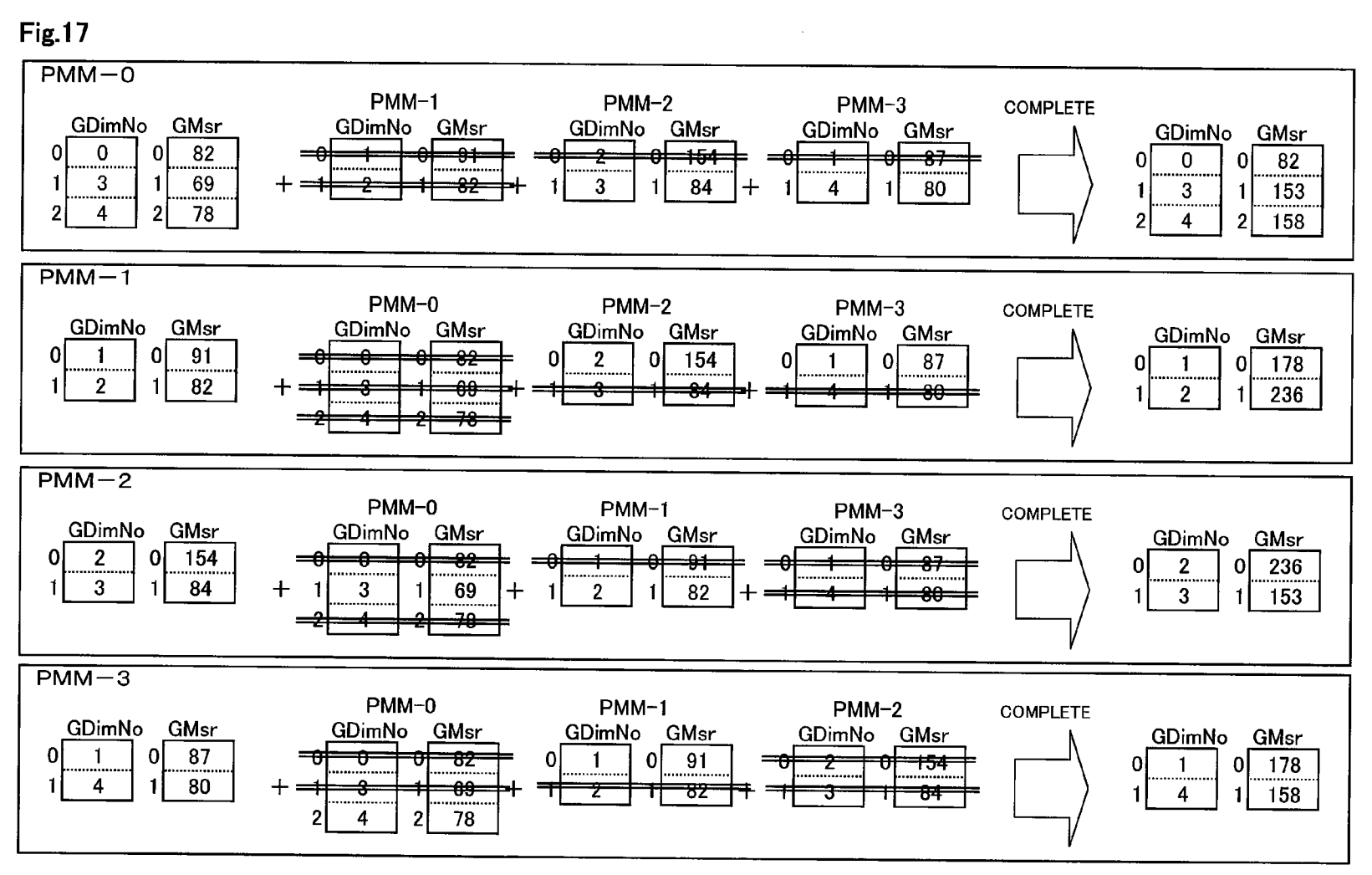

Each of the processing modules adds the local tabulation result mutually exchanged for each global dimension value number in each of the processing modules and calculates a global tabulation result. FIG. 17 is a diagram for explaining calculation of a global tabulation result. Data actually used for global tabulation in each of the processing modules among the local tabulation result that each of the processing modules receives from the other processing modules are only data including a global dimension value number coinciding with a global dimension value number of the local tabulation result of each of the processing modules. In FIG. 17, data not used for actual global tabulation among the data that each of the processing modules receives from the other processing modules are indicated by double cancellation lines. Each of the processing modules is also capable of adding measures received from the other processing modules in parallel. This makes it possible to increase overall processing speed.

As shown in FIG. 17, a global tabulation result is obtained in each of the processing modules according to the addition of the local tabulation results. For example, since a global dimension value number "0" is originally present only in the PMM-0, a tabulation result for the global dimension value number "0" appears only in the PMM-0. On the other hand, since a global dimension value number "3" is locally tabulated in the two processing modules PMM-0 and PMM-2, a global tabulation result corresponding to the global dimension value number "3" appears in the two processing modules PMM-0 and PMM-2. It goes without saying that both the global tabulated values of the PMM-0 and the PMM-2 concerning the global dimension value number "3" take the same value "153".

It is convenient for later processing to delete such overlapping global tabulation results. Therefore, it is possible that, orders are allocated to the processing modules in advance and, when a processing module higher in order than each of the processing modules holds the same global tabulated value as a global tabulated value for a global dimension value number held by the processing module, the processing module deletes the global tabulated value held by the processing module. FIG. 18 is a diagram for explaining processing for excluding such overlapping of global tabulated values. In the figure, double cancellation lines represent overlapping of global tabulated values. By applying this processing, one global tabulated value is held for each global dimension value number throughout all the processing modules.

Figure 19:
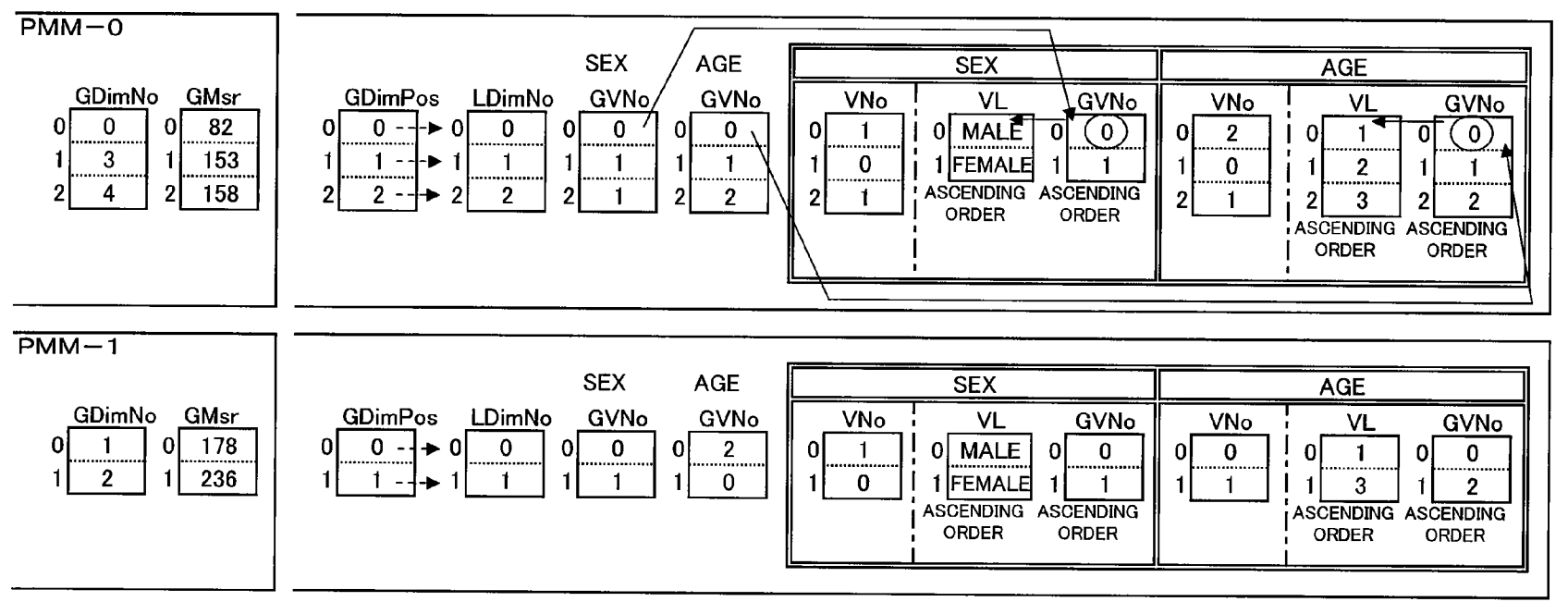

Finally, in step 807, a processing module that holds a final global tabulated value restores the set of item values from the set of global item value numbers and creates a result table including a set of item values and a tabulated value corresponding to the set of item values. FIG. 19 is a diagram for explaining creation of a result table. By representing a tabulation result in a form of such a result table, there is an advantage that it is possible to use the result table for further tabulation processing. In the example in FIG. 18, since a final global tabulated value is held in the processing modules PMM-0 and PMM-1, a result table only has to be created in the processing modules PMM-0 and PMM-1.

Figure 20:
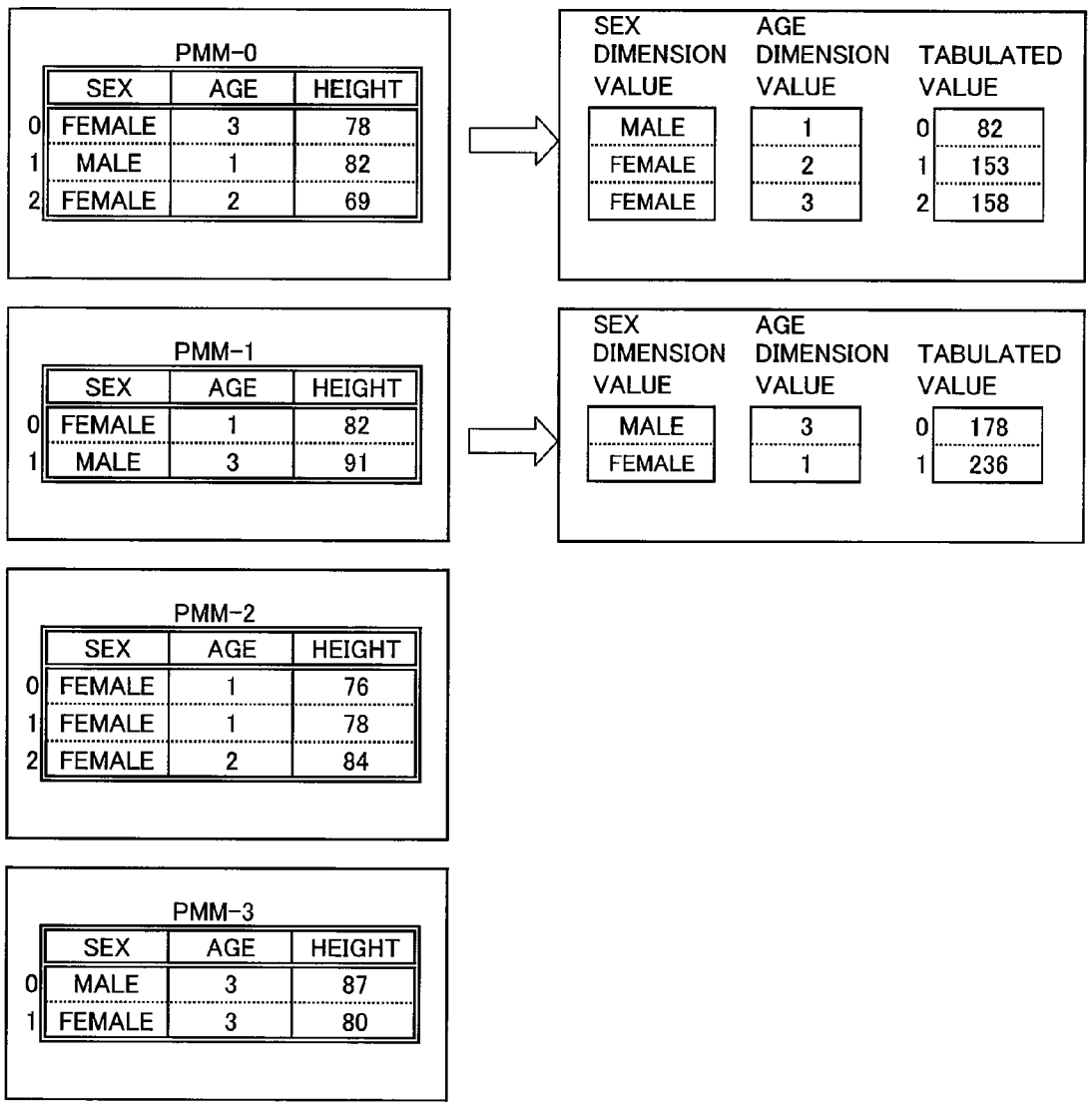
FIG. 20 is a diagram for explaining a result table.

For example, in the processing module PMM-0, a global tabulation result of the global dimension value number "0" is "82". It is possible to acquire the local dimension value number LDimNo corresponding to the global dimension value number GDimNo "0" by using the correspondence table GDimPos of correspondence from a global dimension value number to a local dimension value number explained with reference to FIG. 12. In the example in FIG. 19, since a value of GDimPos corresponding to GDimNo "0" is "0", an element "0" at the top of the array LDimNo is a local dimension value number. A global item value number of sex "0" and a global item value number of age "0" correspond to the local dimension value number "0". An item value, that is, a dimension value, corresponding to the global item value number of sex "0" is "male" and an item value, that is, a dimension value, corresponding to the global item value number of age "0" is "1". Thus, it is possible to obtain a dimension value of sex "male", a dimension value of age "1", and a tabulated value (=a total value of height) "82" with respect to the global dimension value number "0". It is possible to obtain a result table by applying the same processing to the other global dimension value numbers of the processing module PMM-0 and the global dimension value number of the processing module PMM-1. FIG. 20 is a diagram for explaining a result table created in this way. The processing modules PMM-0 and PMM-1 create a result table of a sex dimension value, an age dimension value, and a tabulated value. The processing modules PMM-2 and PMM-3 do not create a result table.

Figure 21:
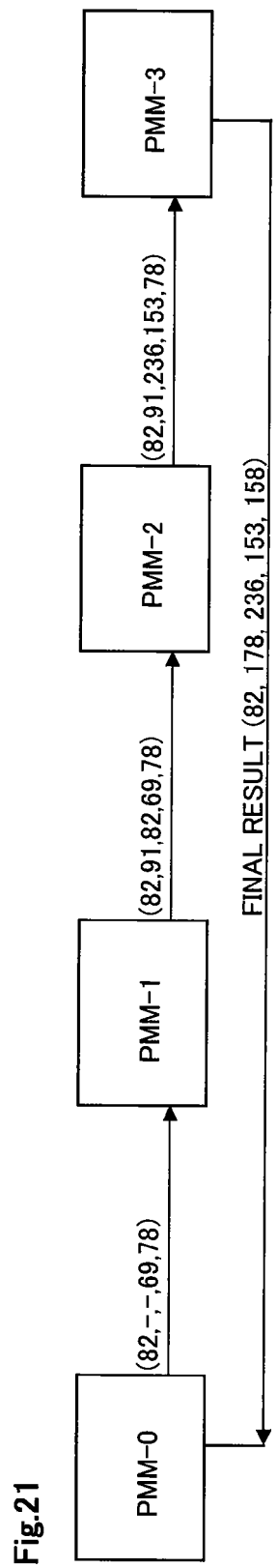
FIG. 21 is a diagram for explaining a second global tabulation method according to the embodiment of the invention.

The first global tabulation method is explained in FIGS. 16 to 18. In a modification of this embodiment, a second global tabulation method is carried out. FIG. 21 is a diagram for explaining the second global tabulation method. In this tabulation method, orders are allocated to processing modules in advance and the array GMsr, which is a local tabulation result, is sequentially transmitted from higher order processing modules to lower order processing modules. A second or subsequent module adds a local tabulation result in the processing module to the tabulation result array GMsr received from the preceding processing module and transmits the tabulation result array GMsr after the addition to the next processing module. Since the processing modules transmit the tabulation result array GMsr to the following processing modules in order while adding up tabulation results in this way, a tabulation result array transmitted through the series of processing modules and returned to the first highest order processing module is an array that stores global tabulation results concerning all the global dimension value numbers.

In an example in FIG. 21, first, a tabulation result array (82, -, -, 69, 78) is transmitted from the highest order processing module PMM-0 to the next processing module PMM-1. "-" indicates that no local tabulation result is present. The processing module PMM-1 adds a local tabulation result (-, 91, 82, -, -) in the processing module to the tabulation result array (82, -, -, 69, 78) received to create another tabulation result array (82, 91, 82, 69, 78) and transmits the tabulation result array to the next processing module PMM-2. Similarly, the PMM-2 adds a local tabulation result (-, -, 154, 84, -) in the processing module to the tabulation result array received to create another tabulation result array (82, 91, 236, 153, 78) and transmits the tabulation result array to the next processing module PMM-3. Similarly, the PMM-3 adds a local tabulation result (-, 87, -, -, 80) in the processing module to the tabulation result array received to create another tabulation result array (82, 178, 236, 153, 158). Since the PMM-3 is a lowest order processing module, the tabulation result array outputted from the PMM-3 is a final tabulation result.

[Order Number Allocation Processing]

In an information processing system in which plural processing modules that have memories storing a list of values with orders, respectively, are logically connected in a ring shape like the information processing system according to this embodiment, an information processing method of allocating order numbers, which are common among the plural processing modules, to values individually ordered in each of the processing modules, that is, an order number allocating method is required.

For example, as explained with reference to FIG. 12, in allocating global dimension value numbers, order number allocation processing for allocating order numbers, which are common among the plural processing modules, to values ordered individually in each of the processing modules is used. This order number allocation processing is not only used when a global dimension value number is allocated but also when a global item value number is set in compile processing described later.

Figure 22:
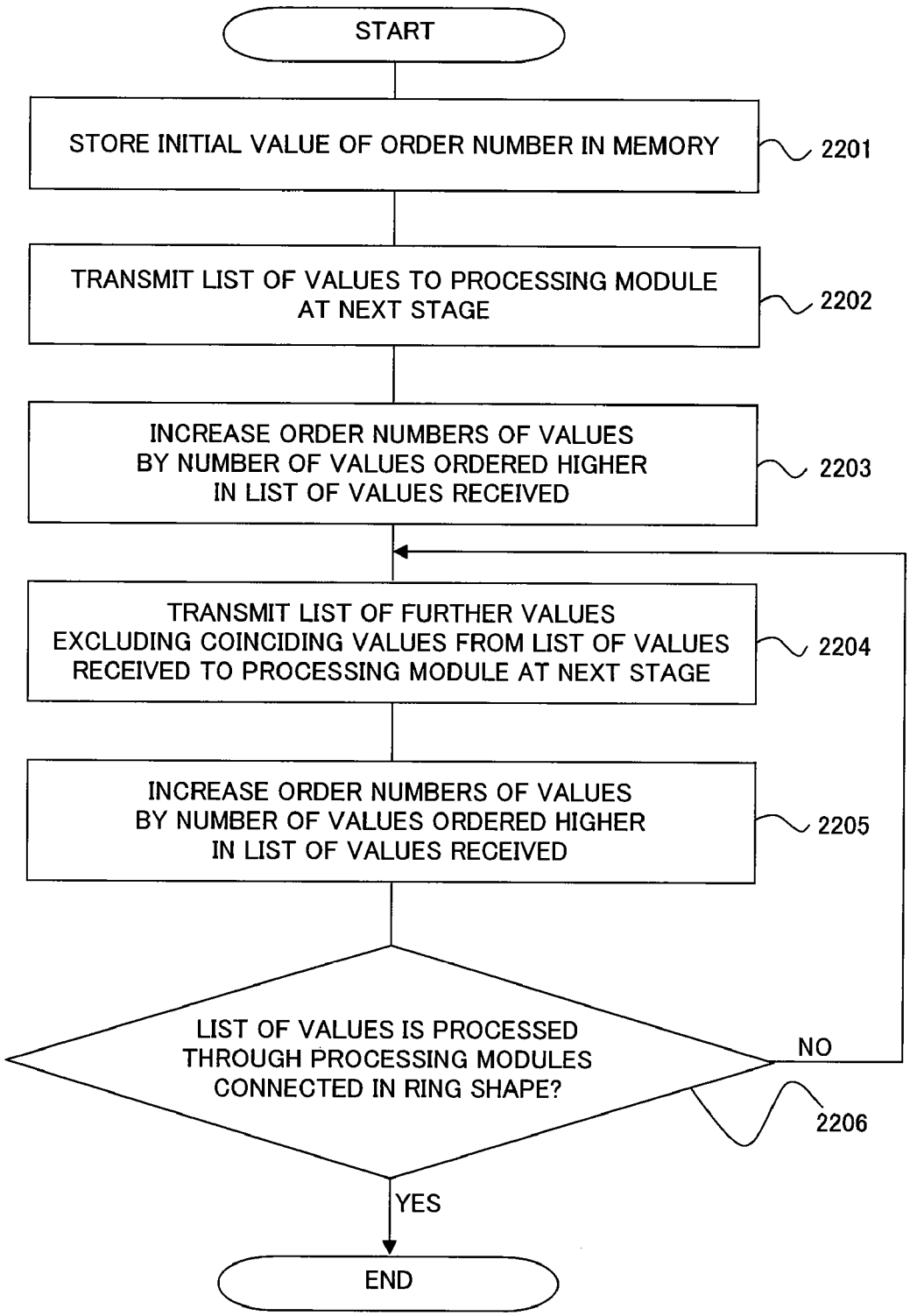
FIG. 22 is a flowchart of an order number allocating method according to the embodiment of the invention.

FIG. 22 is a flowchart of the order number allocating method in this embodiment. As shown in the figure, each of the processing modules stores, in the memory, an initial value of an order number of each value in a list of values in the processing module (step 2201).

Each of the processing modules transmits a list of values stored in the memory of the processing module to a processing module logically connected to the next stage (step 2202). Moreover, each of the processing modules counts, with respect to the respective values in the list of values in the processing module, the number of values ordered higher than the respective values in a list of values received from a processing module logically connected to the preceding stage, updates the order numbers of the respective values in the list of values in the processing module by increasing the order numbers of the respective values in the list of values in the processing module by the number counted, and stores the order numbers updated in the memory (step 2203).

Each of the processing modules transmits a list of further values obtained by excluding values coinciding with the values in the list of values in the processing module from the values in the list of values received to the processing module logically connected to the next stage (step 2204). Each of the processing modules counts, with respect to the respective values in the list of values in the processing module, the number of values ordered higher than the respective values in a list of further values received from a processing module logically connected to the preceding stage, updates the order numbers of the respective values in the list of values in the processing module by increasing the order numbers of the respective values in the list of values in the processing module by the number counted, and stores the order numbers updated in the memory (step 2205).

Subsequently, each of the processing modules repeatedly executes steps 2204 and 2205 until the list of values transmitted to the processing module logically connected to the next stage in the transmission step 2202 is received by the processing module logically connected to the preceding stage via the other processing modules logically connected in a ring shape (step 2206).

According to this order number allocating method, each of the processing modules can receive lists of values held by the other processing modules without redundancy and allocate a global order number to the values held by the processing module. As described above, when each of the processing modules holds a list of values with orders in advance, it is possible to extremely efficiently allocate a global order number. This is because, when lists of values are ordered, the orders only have to be compared in one direction of an ascending order (or a descending order). It goes without saying that the same result can be obtained when a list of values held by each of the processing modules is not ordered. In that case, for example, each of the processing modules only has to compare values in the lists of values received from the other processing modules with values in the list of values held by the processing module in order for all combinations, count the number of values ordered higher than the respective values, that is, in higher orders, and update order numbers of the respective values.

In the order number allocating method in this embodiment, each of the processing modules does not need to store the lists of values received from the other processing modules and can allocate common order numbers to all the processing modules simply by allocating orders to the list of values held by the processing module.

Since this order number allocating method is not affected by an order of reception of the list of values from the other processing modules, the order number allocating method does not depend on a physical connection form among the processing modules at all. Therefore, it is possible to realize a further increase in speed by multiplexing a transmission path and an order number updating circuit.

FIGS. 23A to 23D and 24A to 24D are diagrams for explaining order number allocation processing. In FIGS. 23A to 23D, a list of values that each of PMMs transmits to a PMM connected to the next stage is shown for each step. In FIGS. 24A to 24D, a list of values that the PMM receives from the PMM connected to the preceding stage in each step is shown. In this example, as an initial state, the PMM-0 holds a list of values [18, 21, 24], the PMM-1 holds a list of values [16, 28], the PMM-2 holds a list of values [16, 20, 33], and the PMM-3 holds a list of values [18, 24].

At a point when a step 3 ends, each of the PMMs can receive lists of values from all the other processing modules. At this point, it is possible to determine orders of all the values by combining the list of values held by the processing module and the lists of values received. Moreover, at a point when a step 4 ends, it is seen that all the values can be received without redundancy.

[Compile Processing]

Compile processing is processing for setting a global record number GOrd and a global item value number GVNo used for managing data in each of the processing modules. It is possible to easily set the global record number GOrd by using the offset value OFFSET. On the other hand, the global item value number GVNo is a number that is ordered in common among all the processing modules on the basis of a value list individually held by each of the processing modules.

Therefore, each of the processing modules is capable of setting the global item value number GVNo by using the order number allocation processing.

[Local Sort Processing]

Local sort processing is processing executed as a part of global tabulation processing or a part of global sort processing as explained with reference to FIG. 9. In this embodiment, since the local sort processing is independently performed in each of the processing modules, it is possible to increase processing speed of tabulation processing by increasing speed of this local sort processing.

Figure 26:
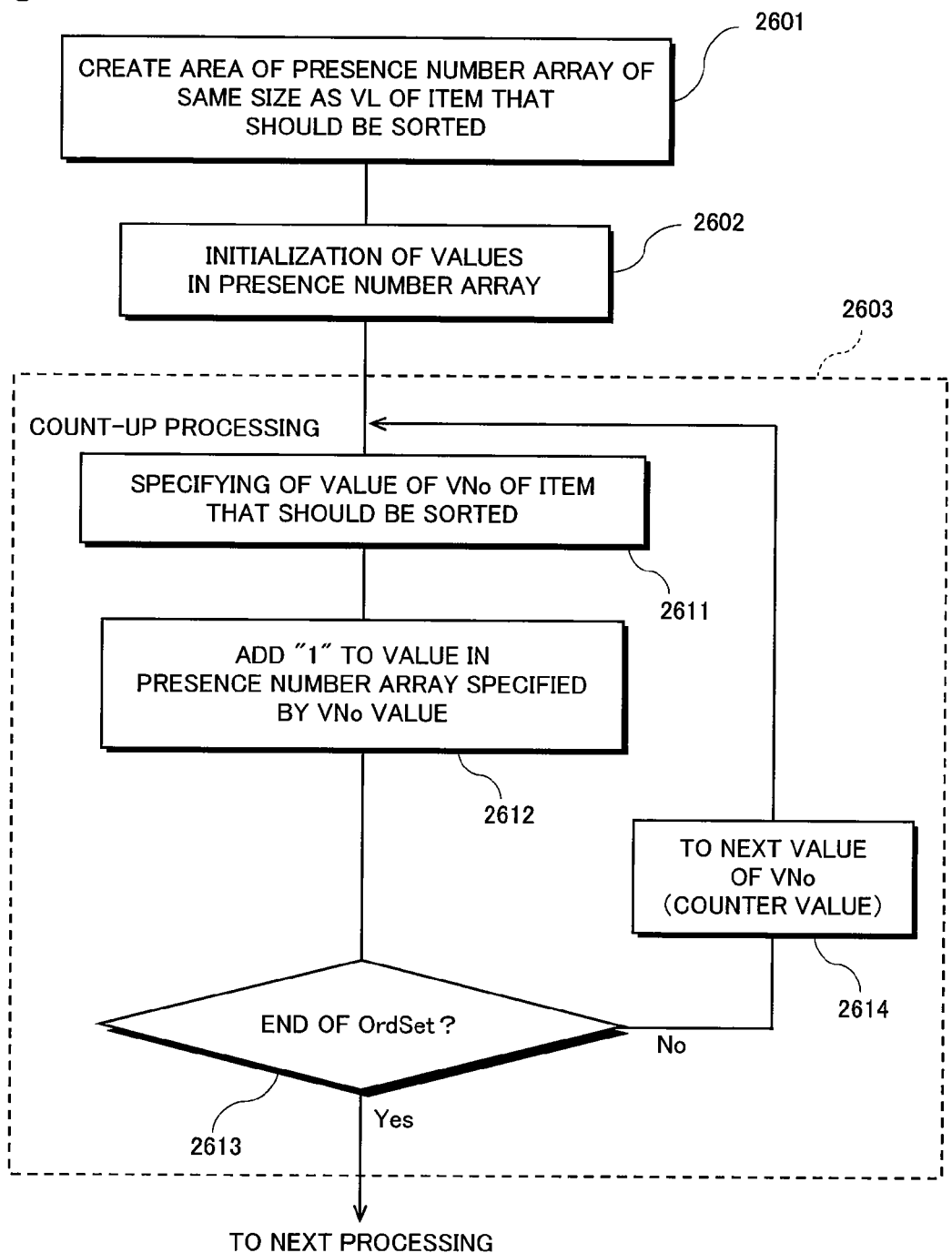
FIG. 26 is a flowchart of local sort processing according to the embodiment of the invention.
Figure 27:
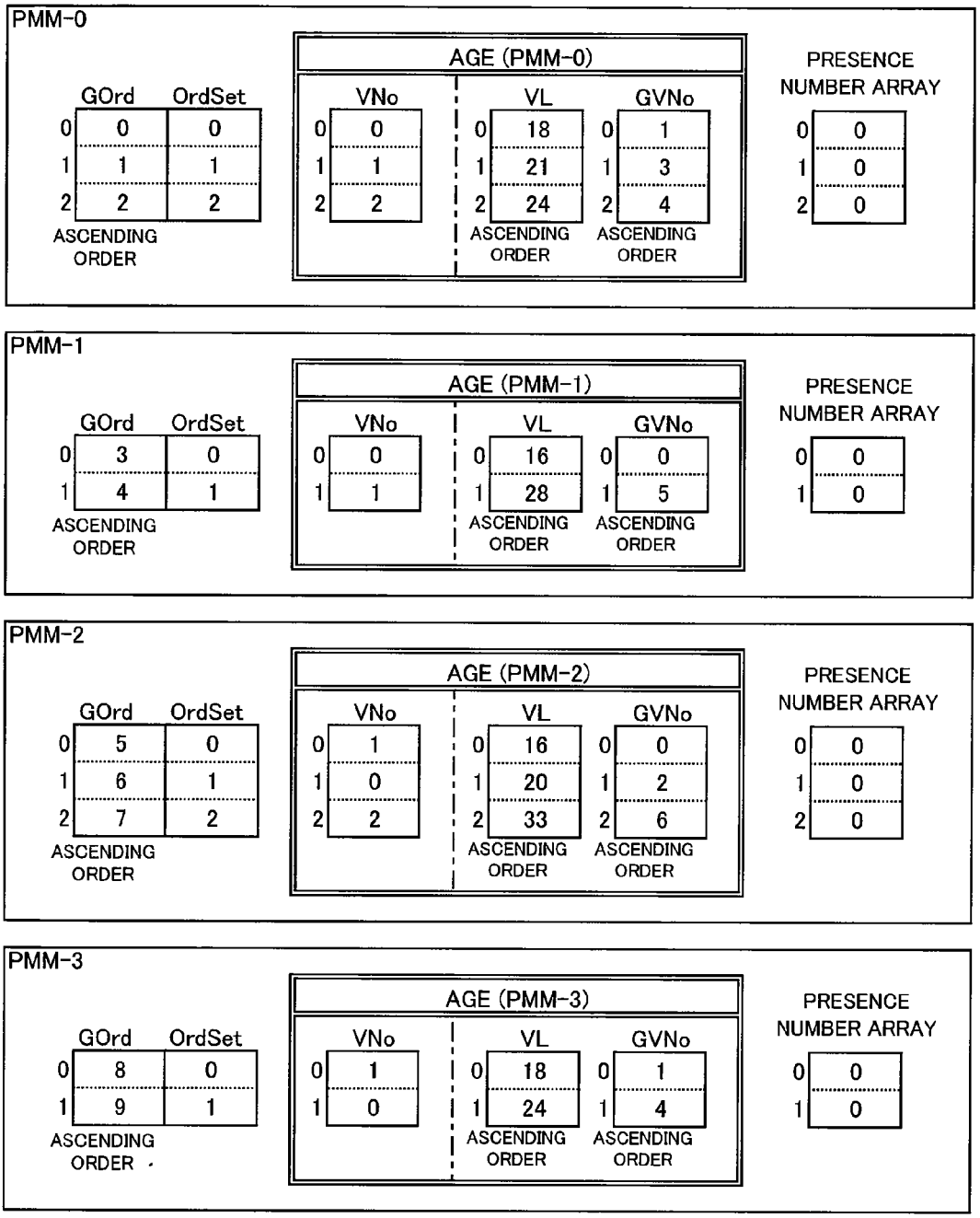
FIG. 27 is a diagram for explaining an example of an initial state of the local sort processing.

This local sort processing will be hereinafter explained. The local sort processing is explained assuming that the processing is started from a state in which the compile processing ends as shown in FIG. 25. FIG. 26 is a flowchart of the local sort processing. As shown in FIG. 26, each of the PMMs creates an area of a presence number array having a size identical with that of the value list VL concerning an item that should be sorted (step 2601) and gives an initial value "0" to the respective values in the area (step 2602). FIG. 27 shows a state in which, for an item "age", an area having a size identical with that of the value list VL is created in each of the PMMs and an initial value "0" is given to respective values in the area.

Subsequently, each of the PMMs executes count-up processing for each value in the presence number array (step 2603). More specifically, each of the PMMs specifies, with reference to values of the order set array OrdSet, a value of the array of pointers VNo of the item that should be sorted (step 2611). Each of the PMMs counts up a value of a position indicated by the value of the array of pointers VNo in the presence number array (step 2612). Such processing is repeated up to the end of the order set array OrdSet (see steps 2613 and 2614).

Figure 28:
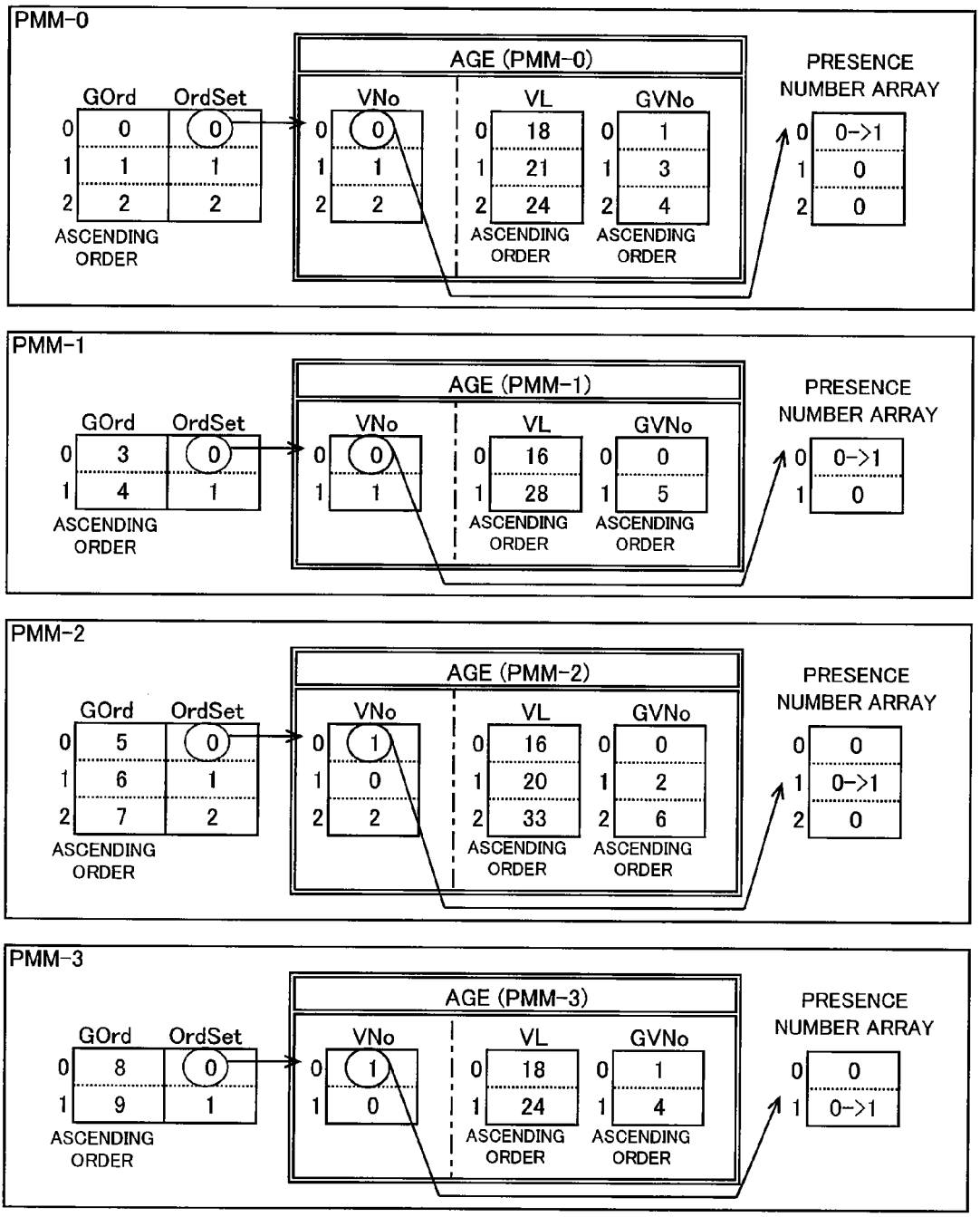
FIG. 28 is a diagram for explaining an example of count-up processing in each of PMMs.

FIG. 28 is a diagram showing an example of count-up in each of the PMMs. For example, in the PMM-0, a value of the array of pointers VNo of age in a position indicated by an element "0" of the order set array OrdSet is "0". Therefore, a value in a "0th" position, that is, a top position, of the presence number array is counted up from "0" to "1". It would be understood that the same processing is executed in the other PMMs.

Figure 29:
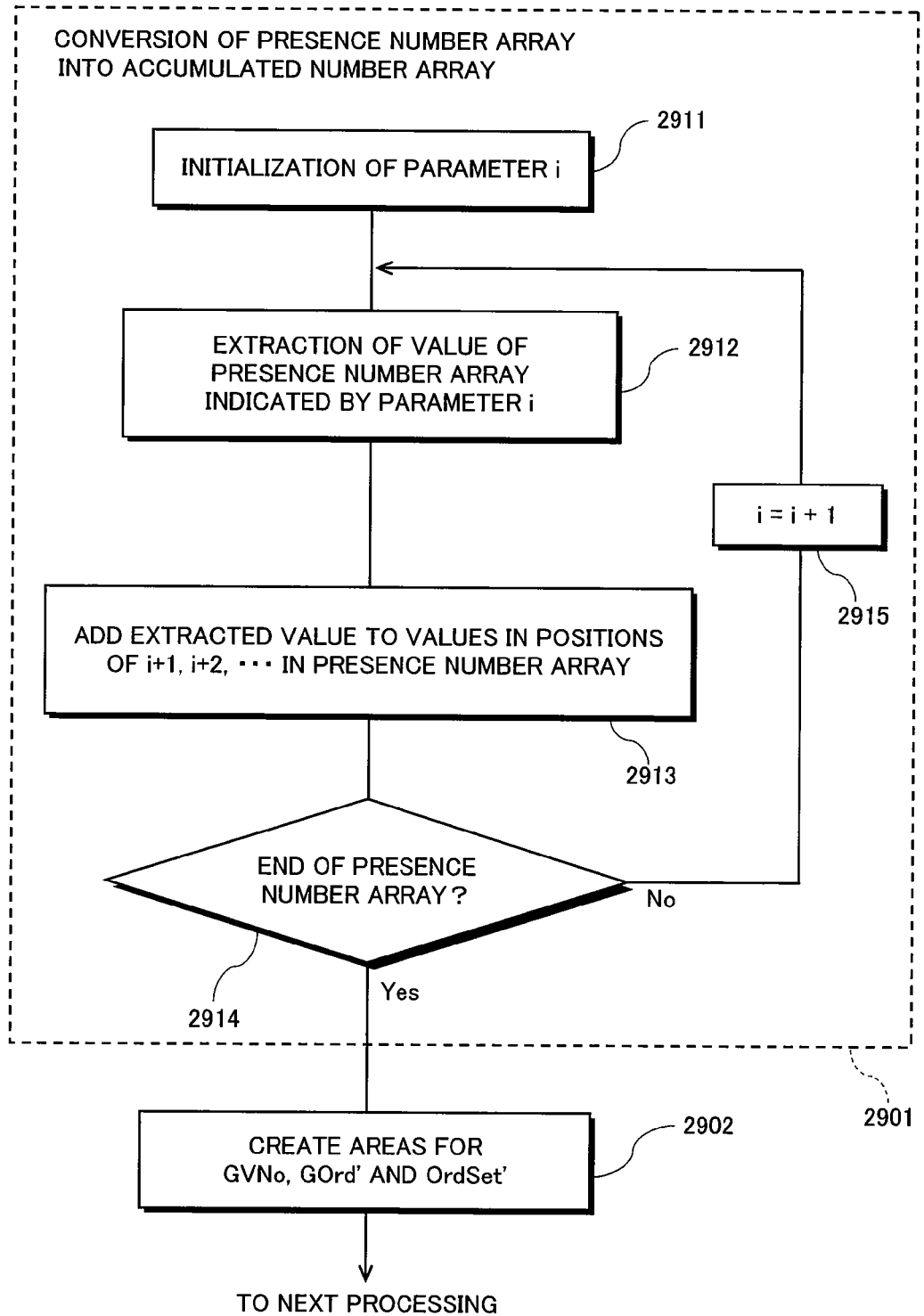
FIG. 29 is a diagram for explaining an example of accumulated number array creation processing.

When the count-up processing ends, as shown in FIG. 29, each of the PMMs accumulates elements of the presence number array and converts the presence number array to an accumulated number array (step 2901). Taking into account the presence number indicating the number of records indicating item values, an accumulated number, which is an element of the accumulated number array, indicates a position at the top of a record indicating an item value of a position where the accumulated number is arranged. Specifically, each of the PMMs initializes a parameter "i" indicating a position of an array (step 2911), extracts a value in a presence number array indicated by the parameter (step 2912), and adds the value extracted in step 2912 to values of the presence number array in positions behind the position indicated by the parameter "i", that is, positions "i+1", "i+2", and the like, respectively (step 2913). The processing indicated by steps 2912 and 2913 only has to be repeated by the number of elements (item values) of the value list VL (see steps 2914 and 2915).

Figure 30:
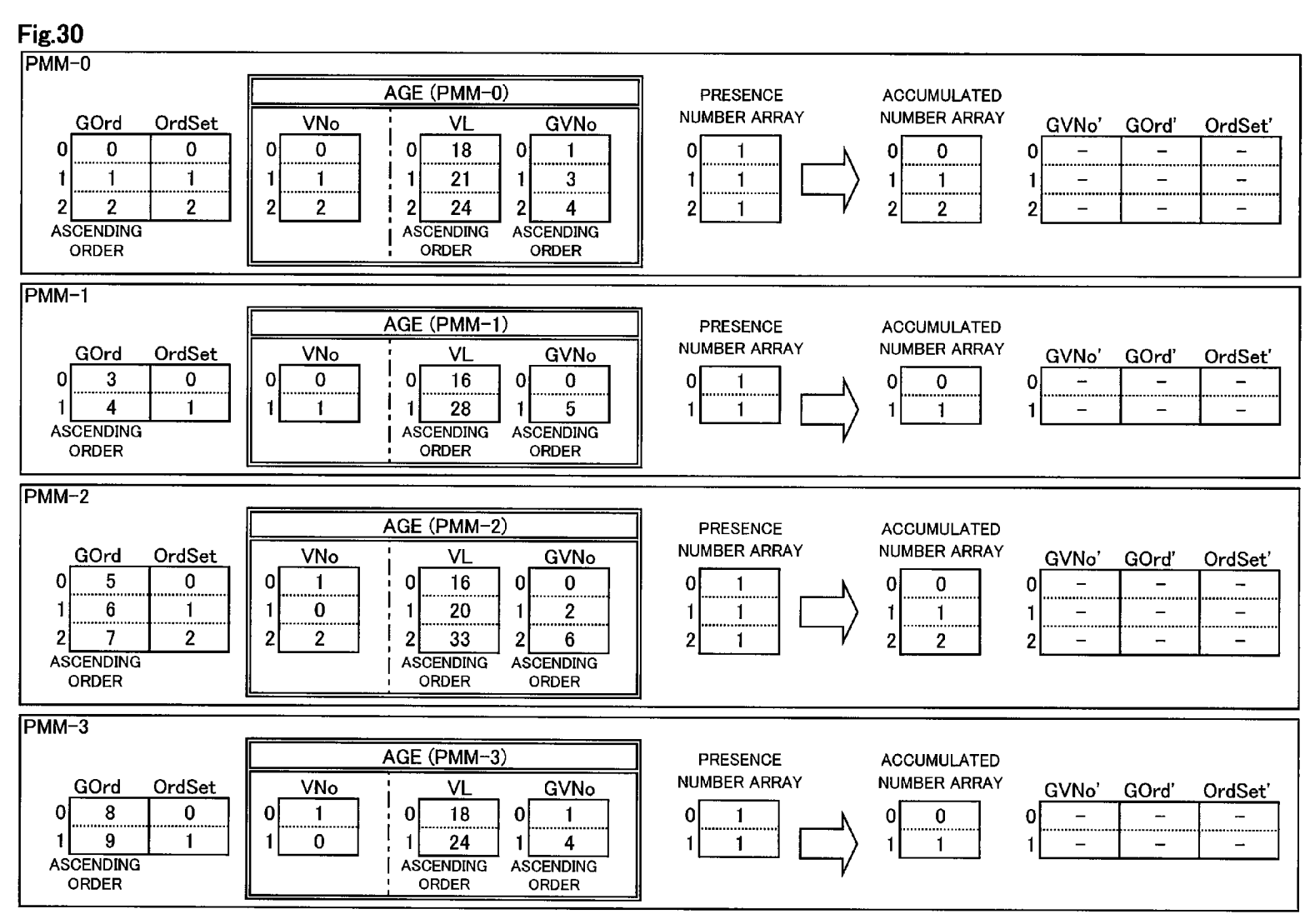

In this way, for example, it is possible to obtain an accumulated number array shown in FIG. 30. Moreover, each of the PMMs also creates areas for arrays GVNo, GOrd', and OrdSet' for storing orders in all the PMMs later (step 2902). Sizes of the arrays coincide with the size of the value list VL, respectively.

Figure 31:
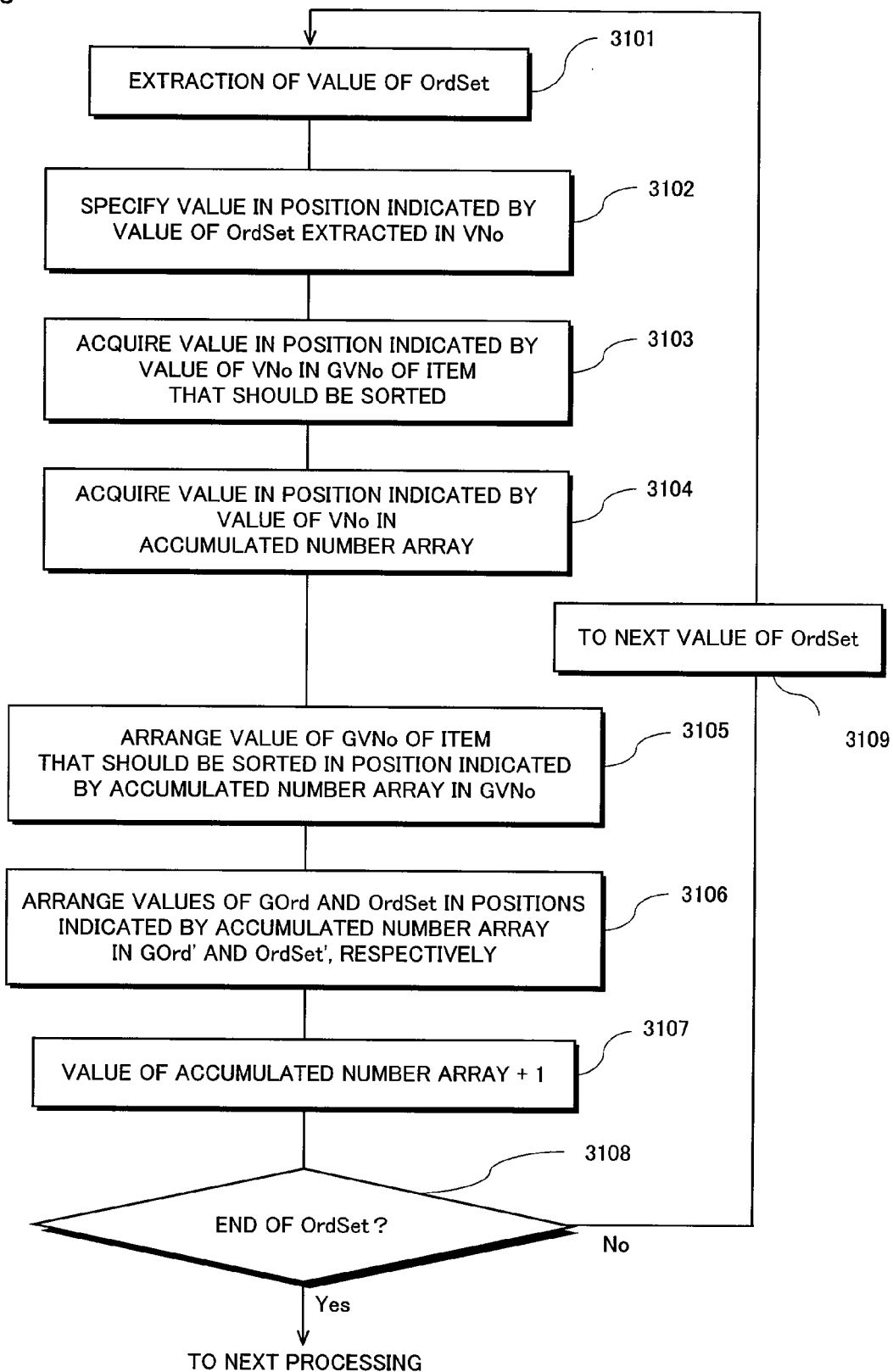
FIG. 31 is a detailed flowchart of the local sort processing.

Subsequently, local sort processing in each of the PMMs is executed. As shown in FIG. 31, each of the PMMs extracts a value of the order set array OrdSet (step 3101) and specifies a value (a pointer value) in a position indicated by a value of the array OrdSet in the array of pointers VNo (step 3102). Thereafter, each of the PMMs acquires a value of a position indicated by a value of the array of pointers VNo in the global item value number array GVNo of an item that should be sorted (step 3103). This value is used for processing for storing a value described later. On the other hand, in the accumulated number array, a value of a position indicated by the array of pointers VNo is also acquired (step 3104). This value is used for designating a position in an array in the processing for storing a value described later.

The processing for storing a value is executed. Each of the PMMs arranges the value of GVNo concerning the item that should be sorted acquired in step 3102 in the position indicated by the value of the accumulated number array acquired in step 3104 (step 3105). Each of the PMMs arranges values of the global order set array GOrd and the order set array OrdSet in the position indicated by the value of the accumulated number array acquired in step 3104 in the arrays GOrd' and OrdSet', respectively (step 3106). Subsequently, the value of the accumulated number array used for the processing is incremented (step 3107).

The processing in steps 3101 to 3107 is sequentially executed for all the values in the array OrdSet (see steps 3108 and 3109).

Figure 32:
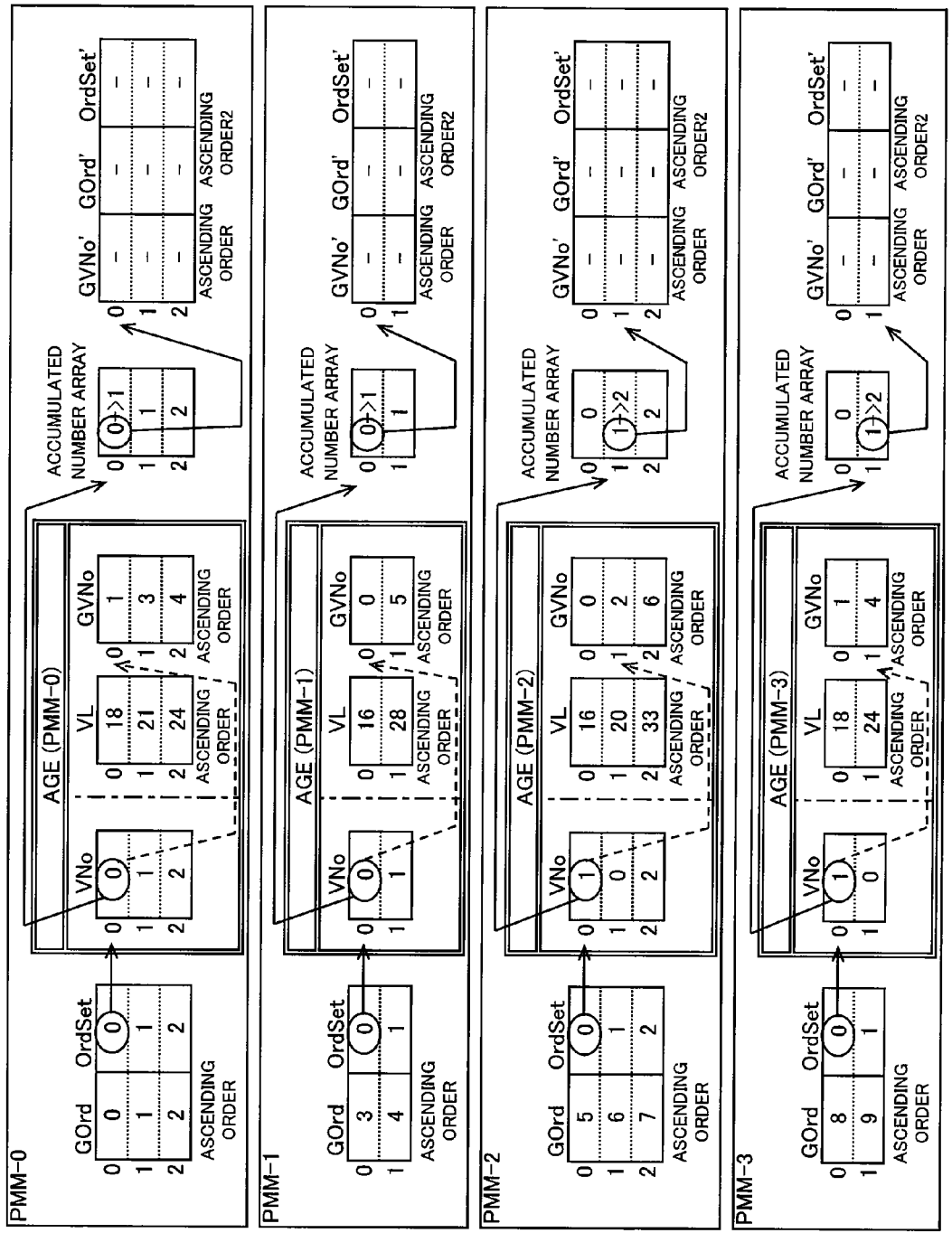
FIG. 32 is a diagram for explaining an example of an execution state of the local sort processing in each of the PMMs.
Figure 33:
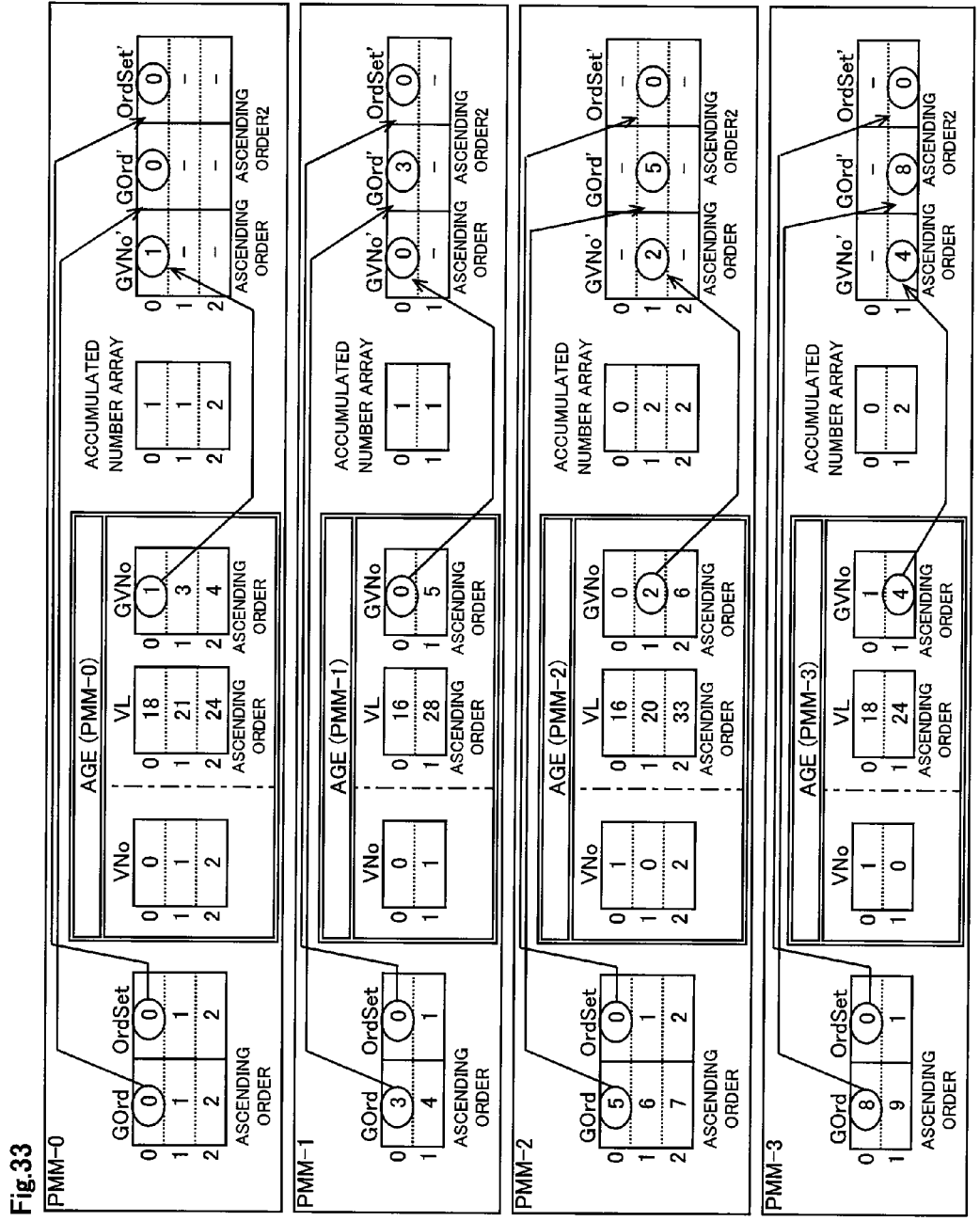
FIG. 33 is a diagram for explaining an example of execution state of the local sort processing in each of the PMMs.

FIGS. 32 and 33 are diagrams showing an example of a state in which the local sort processing is executed in each of the PMMs. For example, concerning the PMM-0, in FIG. 32, it would be understood that extraction of a value "0" of the array OrdSet (see step 3101), specifying of a value "0" of the array VNo in a position indicated by the value "0" of OrdSet (see step 3102), acquisition of a value "1" of the array GVNo in a position indicated by the value "0" of the array VNo (step 3103), and acquisition of a value "0" of the accumulated number array in a position indicated by the value "0" of the array VNo (step 3104) are executed. It is also seen that, after the acquisition of an accumulated number array, a value of the accumulated number array changes from "0" to "1" (see step 3107).

Concerning the PMM-0, in FIG. 33, it would be understood that arrangement of a value "1" of the array GVNo concerning the item "age", a value "0" of the array GOrd, and a value "0" of the array OrdSet in the arrays GVNo, GOrd', and OrdSet' in the position indicated by the value of the accumulated number array acquired in step 3103 (steps 3105 and 3106) are shown. Concerning the other PMMs, in FIGS. 32 and 33, it is also seen that the processing indicated in steps 3101 to 3105 is also executed.

It is possible to obtain an array shown in FIG. 34 according to the local sort processing (i.e., sort processing in each of the PMMs). In FIGS. 32 to 34, an "ascending order 2" in the figures means that the global record number GOrd' is in an "ascending order" in a range in which the global item value number GVNo' takes an identical value.

The local sort processing explained above has an excellent characteristic that a comparative operation is not performed. In general, in sort in which comparison is performed, when the number of data is n, a processing amount is $O(n*\log(n))$. In sort in which comparison is not performed, a processing amount is $O(n)$. Counting sort in which comparison is not performed includes approximately three stages of count-up, number accumulation, and transfer. The number of processing steps is equivalent to 3n when all data are different. Thus, when there are n non-overlapping data and there are m computers, in a model in which the n data are divided by m, respective divided portions are locally sorted, and the divided portions are integrated by global sort, the approximate number of steps of the global sort is equivalent to $(m-1)*(2*n/m)$.

The first term (m−1) represents the number of times each of the computers should receive data from the other computers and process the data. The second term (2*n/m) is the number of times of comparison that occurs in average when two kinds of ascending order lists, that is, n ascending lists and m ascending lists, are compared. When m is large, the number of times is equivalent to approximately 2*n. The number of steps of the global sort is O(n). In other words, the global sort is more efficient than the sort O(n*log(n)) in which comparison is performed. It can be considered that this is because the sort is made efficient by comparing the list in the ascending order. On the other hand, disappearance of m means that, even if the number of computers increases, a processing amount per one computer in the global sort does not change.

[Another Embodiment of the Local Sort Processing]

The local sort processing is excellent in that the respective processing modules can be operated in parallel. However, it is also possible to realize the local sort processing in other systems. For example, when the number of computers m equals the number of data n, the local sort processing may be realized using the idea of the order number allocation processing.

For example, the local sort processing according to this another embodiment will be explained concerning the example in which sort is performed on the basis of "age" and "sex" explained with reference to FIG. 9.

In the example in which sort is performed on the basis of age and sex, if a three-dimensional array of sex GVNo, age GVNo, and GOrd is created for respective records and order numbers are allocated to the three-dimensional array at a time in each of the PMMs, the same result as the local sort processing is obtained. FIGS. 35A to 35F are diagrams for explaining local sort processing using the order number allocation processing, respectively.

First, as shown in FIG. 35A, each of the PMMs creates a three dimensional array consisting of GVNo of sex, GVNo of age, and GOrd for the respective elements of OrdSet. In the following explanation, a three-dimensional array of OrdSet=i is represented as A[i]=(a,b,c). In this example, A[0]=(1,2,0), A[1]=(0,0,1), and A[2]=(1,1,2).

Subsequently, as shown in FIG. 35B, each of the PMMs initializes order numbers.

As shown in FIG. 35C, each of the PMMs allocates order numbers. In this example, each of the PMMs sends A[0] to OrdSet1, sends A [1] to OrdSet2, sends A[2] to OrdSet0, compares the three-dimensional array held by the PMM and the arrays sent, and allocates order numbers.

Moreover, as shown in FIG. 35D, each of the PMMs sends A[0] to OrdSet2, sends A[1] to OrdSet0, sends A[2] to OrdSet1, compares the three-dimensional array held by the PMM and the arrays sent, and allocates order numbers.

As a result of such order number allocation processing, a result shown in FIG. 35E is obtained. A result replaced in an order of order numbers is shown in FIG. 35F. The result shown in FIG. 35F coincides with the result of local sort shown in FIG. 9.

[SIMD Type Parallel Processing]

When an algorithm of parallelization is poor, it is difficult to develop a program for adopting SIMD to obtain a desired result. Even if the program could be developed, a degree of freedom of the program is low. Thus, in order to adopt the SIMD, it is necessary to develop an excellent algorithm suitable for the SIMD. In this regard, the algorithm according to this embodiment is excellent in the following points.

(1) There is no conditional branch in execution of processing. However, in the case of retrieval processing, it is likely that conditional branch is performed. However, the conditional branch is a simple conditional branch.

(2) A ratio occupied by processing that can be executed by one command (the number of steps and the number of clocks) such as mutual comparison of lists in an ascending order is high.

(3) All the processing modules equally have the same roles. If each of the processing modules has different roles, it is impossible to realize processing according to a single command. Therefore, in this embodiment, a program is simplified when the SIMD is adopted. It is possible to secure easiness of development of a program and a high degree of freedom of the program.

[System Configuration]

The information processing system according to the invention is connected to, for example, a terminal apparatus serving as a front end via a channel of a ring shape and each of the PMMs receives a command from the terminal apparatus. This makes it possible to execute the processing for compile, sort, and tabulation in the PMMs. Each of the PMMs only has to transmit a packet using any one of buses and it is unnecessary to control synchronization and the like among the PMMs from the outside.

A general-purpose CPU may be included in a control device in addition to an accelerator chip including a hardware configuration for iterative operations such as compile and sort. The general-purpose CPU can interpret a command transmitted from the terminal apparatus via the channel and give a necessary instruction to the accelerator chip.

Moreover, it is desirable that a register group for housing various arrays necessary for work such as an order set array and a global order set array is provided in the control device, in particular, in the accelerator chip in the control device. Consequently, once a value necessary for processing is loaded onto the register from the memory, the control device only has to read out the value from the register or write the value in the register without accessing the memory during the processing operation for compile, sort, and tabulation. This makes it possible to significantly reduce the number of times of memory access (load before arithmetic processing and writing of a processing result) and significantly reduce processing time.

[Concerning the Global Set Array Gord and the Global Item Value Number Array GNo]

Significance of the array GOrd and the array GVNo introduced in this embodiment will be explained. The global order set array GOrd indicates a position (order) of each of records of the table format data grasped by each of the PMMs in the global table format data formed by collecting the local table format data grasped by each of the PMMs. In other words, in this embodiment, position information of the records is separated into global components and local components according to the global order set array GOrd and the order set array OrdSet. This makes it possible to treat global table format data. Further, each of the PMMs is capable of independently executing processing.

In this embodiment, the PMMs are constituted to hold information blocks of respective items. However, even when the PMMs hold table format data as they are, GOrd functions in the same manner.

For example, it is possible to create a view of the entire table format data by extracting item values of the respective items in an order of values of the global order set array GOrd in a state in which compile ends in this embodiment (see, for example, FIG. 25).

It goes without saying that the invention is not limited to the embodiment described above, various modifications of the invention are possible within the scope of the invention described in claims, and the modifications are included in the scope of the invention.

In the embodiment, the PMMs are connected in a ring shape in a first bus (a first transmission path) for transmitting a packet clockwise on the one hand and a second bus (a second transmission path) for transmitting a packet counterclockwise on the other. Such a constitution is advantageous because it is possible to uniformalize a delay time and the like of packet transmission. However, the invention is not limited to this and transmission paths of other forms such as a bus type may be adopted.

In this embodiment, the PMMs having memories, interfaces, and control circuits are used. However, the invention is not limited to this. Personal computers, servers, or the like may be used as information processing units that subject local table format data to shared control instead of the PMMs. Alternatively, a constitution in which a single personal computer or server holds plural information processing units may be adopted. Even in these cases, the information processing units can specify a record by receiving values indicating orders of records and referring to the global order set array GOrd. It is also possible to specify an item value by referring to the global value number array.

A so-called network type or bus type transmission path may be adopted as a transmission path among the information processing units.

It is possible to utilize the invention as described below by adopting the constitution in which plural information processing units are provided in a single personal computer. For example, three table format data of the Sapporo branch, the Tokyo branch, and the Fukuoka branch are prepared and, usually, retrieval, tabulation, sort, and the like are executed by a unit of each branch. Moreover, it is possible to devise a global table format data in which the three branches are integrated and realize retrieval, sort, and tabulation concerning the global table format data considering that table format data of the respective branches are partial tables of an entire table.

It goes without saying that, even when plural personal computers are connected to a network, it is also possible to realize processing concerning local table format data subjected to shared control by the personal computers and processing concerning global table format data.

INDUSTRIAL APPLICABILITY

It is possible to apply the invention, in particular, to a system that manages a large amount of data, for example, a database and a data warehouse. More specifically, it is possible to utilize the invention for a large-scale scientific and technical calculation, basic business management such as order management and securities exchange, and office management.

DESCRIPTION OF REFERENCE NUMERALS AND SIGNS

32 PMMs
34 First bus
36 Second bus
40 Control circuit
42 Bus I/F
44 Memory
46 Bank

The invention claimed is:

1. An information processing method of tabulating item values stored in plural processing modules, in an information processing system comprising a plurality of processing modules logically connected in a ring shape, wherein each of the processing modules includes a memory arranged to store table format data representing an array of records, including item values corresponding to an item of information, in forms of a value list in which the item values are stored in an order of item value numbers corresponding to the item values and an array of pointers in which information for designating the item value numbers is stored in an order of the records, the information processing method comprising the steps:

(1) in each of the processing modules, storing in the memory global record numbers uniquely allocated to the records in the processing module among the plural processing modules and global item value numbers ordered with respect to item values in the processing module among the plural processing modules;

(2) in each of the processing modules, sorting, in the processing module, the records in an order determined according to a set of global item value numbers of at least one or more designated items;

(3) in each of the processing modules, storing a set of global item value numbers corresponding to the records in the memory, said set of global item value numbers being associated with dimension value numbers representing orders of the sorted records to the set of global item value numbers;

(4) in each of the processing modules, mutually acquiring sets of global item value numbers from the other processing modules, counting a number of sets of global item value numbers ordered higher than the set of global item value numbers in the processing module, and allocating global dimension value numbers, which are common among the plural processing modules, to the sets of global item value numbers by increasing the dimension value number of the set of global item value numbers in the processing module by the counted number;

(5) in each of the processing modules, calculating, for each of the sets of global item value numbers, a local tabulated value by tabulating item values of predetermined items of information in accordance with a predetermined rule; and (6) in each of the processing modules, acquiring local tabulated values for each of the sets of global item value numbers from the other processing modules and calculating a tabulated value by tabulating the tabulated values acquired for each of the sets of global item value numbers.

2. An information processing method according to claim 1, further comprising a step, after the step of calculating a tabulated value, in each of the processing modules, of restoring a set of item values from the set of global item value numbers and creating a result table including the set of item values and the tabulated value corresponding to the set of item values.

3. An information processing system comprising a plurality of processing modules logically connected in a ring shape and each of the processing modules includes a memory disposed to store table format data presenting an array of records including item values corresponding to an item of information, in forms of a value list in which item values are stored in an order of item value numbers corresponding to the item values and an array of pointers in which information for designating the item value numbers is stored in an order of the records, wherein each of the processing modules is disposed to store, in the memory, global record numbers uniquely allocated to the records in the processing module among the plural processing modules and global item value numbers ordered with respect to item values in the processing module among the plural processing modules, and each of the processing modules includes:

local sort means for sorting, in the processing module, the records in an order determined according to a set of global item value numbers of at least one or more designated items;

dimension value numbering means for storing a set of global item value numbers corresponding to the records in the memory, said set of global item value numbers being associated with dimension value numbers in an order of the sorted records to the set of global item value numbers;

global dimension value numbering means for mutually acquiring sets of global item value numbers from the other processing modules, counting a number of sets of global item value numbers ordered higher than the set of global item value numbers in the processing module, and allocating global dimension value numbers, which are common among the plural processing modules, to the sets of global item value numbers by increasing the dimension value number of the set of global item value numbers in the processing module by the counted number;

tabulating means for calculating, for each of the sets of global item value numbers, a local tabulated value by tabulating item values of predetermined items of information in accordance with a predetermined rule; and global tabulating means for acquiring local tabulated values for each of the sets of global item value numbers from the other processing modules and calculating a tabulated value by tabulating the tabulated values acquired for each of the sets of global item value numbers.

4. An information processing system according to claim 3, wherein each of the processing modules further includes means for restoring a set of item values from the set of global item value numbers and creating a result table including the set of item values and the tabulated value corresponding to the set of item values, the means for restoring being connected to the global tabulating means.

5. A computer-readable medium comprising program for causing a computer of a processing module in an information processing system to execute the steps of claim 1.

6. A computer-readable medium comprising a program of a processing module in an information processing system to execute the steps of claim 2.

7. An information processing system comprising a plurality of processing modules each comprising a memory disposed to store a list of ordered values, and a transmission path that logically connects the plural processing modules in a ring shape, the information processing system disposed to allocate order numbers, which are common among the plural processing modules, to the values in the list of values in each of the processing modules, wherein each of the processing modules includes:

initializing means for storing, in the memory, initial values of the order numbers of the respective values in the list of values in the processing module and transmitting the list of values stored in the memory of the processing module to a processing module logically connected to the next stage;

receiving means for receiving a list of values from a processing module logically connected to the preceding stage;

updating means for counting, with respect to the respective values in the list of values in the processing module, a number of values ordered higher than the respective values in the list of values received by the receiving means, updating the order numbers of the respective values in the list of values in the processing module by increasing the order numbers of the respective values in the list of values in the processing module by the counted number, and storing the order numbers updated in the memory;

transmitting means for transmitting a further list of values to the processing module logically connected to the next stage, said further list being obtained by excluding values coinciding with the values in the list of values in the processing module from the values in the list of values received by the receiving means; and control means for starting the initializing means and causing the receiving means, the updating means, and the transmitting means to repeatedly operate until the list of values transmitted by the initializing means is received by the processing module logically connected to the preceding stage via the other processing modules logically connected in a ring shape.

8. An information processing method of allocating order numbers, which are common among plural processing modules to values held individually in each of the processing modules in an information processing system in which the plural processing modules that have memories storing a list of values, respectively, are logically connected in a ring shape, the information processing method comprising the steps:

(1) in each of the processing modules, storing in the memory initial values of order numbers corresponding to the respective values in the list of values in the processing module;

(2) a first transmission step, in each of the processing modules, comprising transmitting the list of values stored in the memory of the processing module to a processing module logically connected to the next stage;

(3) a first update step, in each of the processing modules, comprising counting, with respect to the respective values in the list of values in the processing module, a number of values ordered higher than the respective values in a list of values received from a processing module logically connected to the preceding stage, updating the order numbers of the respective values in the list of values in the processing module by increasing the order numbers of the respective values in the list of values in the processing module by the counted number, and storing the order numbers updated in the memory;

(4) a second transmission step, in each of the processing modules, comprising transmitting a further list of values to the processing module logically connected to the next stage, said further list being obtained by excluding values coinciding with the values in the list of values in the processing module from the values in the list of values received;

(5) a second update step, in each of the processing modules, comprising counting, with respect to the respective values in the list of values in the processing module, a number of values ordered higher than the respective values in the further list of values received from a processing module logically connected to the preceding stage, updating the order numbers of the respective values in the list of values in the processing module by increasing the order numbers of the respective values in the list of values in the processing module by the counted number, and storing the order numbers updated in the memory; and (6) in each of the processing modules, repeatedly executing the second transmission step and the second update step until the list of values transmitted to the processing module logically connected to the next stage in the first transmission step is received by the processing module logically connected to the preceding stage via the other processing modules logically connected in a ring shape.

9. A computer-readable medium comprising a program for causing a computer of a processing module in an information processing system to execute the steps of claim 8.

* * * * *

UNITED STATES PATENT AND TRADEMARK OFFICE
CERTIFICATE OF CORRECTION

| | |
|---|---|
| PATENT NO. | : 7,849,289 B2 |
| APPLICATION NO. | : 10/595542 |
| DATED | : December 7, 2010 |
| INVENTOR(S) | : Shinji Furusho |

It is certified that error appears in the above-identified patent and that said Letters Patent is hereby corrected as shown below:

TITLE PAGE,

Item (75) Inventor: "Shinji Furusho, Yokohami (JP)" should read --Shinji Furusho, Kanagawa (JP)--

Signed and Sealed this
Thirteenth Day of September, 2011

David J. Kappos
*Director of the United States Patent and Trademark Office*